United States Patent [19]

Panagotopulos et al.

[11] Patent Number: 5,796,007
[45] Date of Patent: Aug. 18, 1998

[54] DIFFERENTIAL PRESSURE TRANSDUCER

[75] Inventors: Louis J. Panagotopulos, Walpole; Herman W. Erichsen, Holliston, both of Mass.

[73] Assignee: Data Instruments, Inc., Acton, Mass.

[21] Appl. No.: 710,814

[22] Filed: Sep. 23, 1996

[51] Int. Cl.$^6$ ............................................. G01L 13/02
[52] U.S. Cl. .................................... 73/716; 73/720
[58] Field of Search .......................... 73/716, 717, 720, 73/721, 744, 760, 768, 774, 788, 790, 807

[56] References Cited

U.S. PATENT DOCUMENTS

| | | | |
|---|---|---|---|
| 1,371,242 | 3/1921 | Hopwood | 73/716 X |
| 1,499,384 | 7/1924 | Lee | 73/716 |
| 1,576,608 | 3/1926 | Helphingstine | 73/716 X |
| 2,579,334 | 12/1951 | Plank | 73/716 X |
| 3,134,260 | 5/1964 | Johnston | 73/716 X |
| 3,742,757 | 7/1973 | Callahan | 73/768 X |
| 3,894,436 | 7/1975 | Jurovsky | 73/716 X |
| 3,895,524 | 7/1975 | Jurovsky | 73/716 X |
| 3,939,712 | 2/1976 | Jurovsky et al. | 73/716 |
| 4,172,388 | 10/1979 | Gabrielson | 73/721 |
| 4,221,134 | 9/1980 | Ekstrom, Jr. | 73/721 |
| 4,299,129 | 11/1981 | Ritzinger | 73/720 X |
| 4,306,460 | 12/1981 | Sakurai et al. | 73/721 |
| 4,309,908 | 1/1982 | Rapp et al. | 73/720 |
| 4,347,745 | 9/1982 | Singh | 73/721 |
| 4,543,862 | 10/1985 | Van Over | 73/720 |
| 4,878,385 | 11/1989 | Lloyd | 73/720 X |
| 5,033,309 | 7/1991 | Wycherley et al. | 73/774 X |
| 5,310,610 | 5/1994 | Furubayashi et al. | 73/717 X |

Primary Examiner—George M. Dombroske
Assistant Examiner—Paul D. Amrozowicz
Attorney, Agent, or Firm—Wolf, Greenfield & Sacks, P.C.

[57] ABSTRACT

A differential pressure transducer for measuring a pressure differential between a first pressure source and a second pressure source. The differential pressure transducer includes a displacement element and a sensing element coupled to the displacement element. The displacement element moves in a linear direction and deflects the sensing element to provide a signal that is proportional to the movement of the displacement element when the first and second ends are subjected to the pressures at the pressure sources. The differential pressure transducer can also include a force transfer beam that connects the displacement element and the sensing element. The sensing element can include a sensing beam and a strain gauge mounted on the beam to provide an electrical signal proportional to the strain in the beam induced by the deflection of the beam. The force transfer beam and the sensing element can be portions of a unitary member formed as a stamped part. The displacement element can be a single piston or it can include a pair of force collectors attached to opposing sides of the force transfer beam. Additionally, the transducer can include overload protection to limit the movement of the displacement element and the force transfer beam. Further, the strain gauge is disposed on a portion of the beam that is externally accessible so as to improve the assembly and maintenance of the transducer.

64 Claims, 11 Drawing Sheets

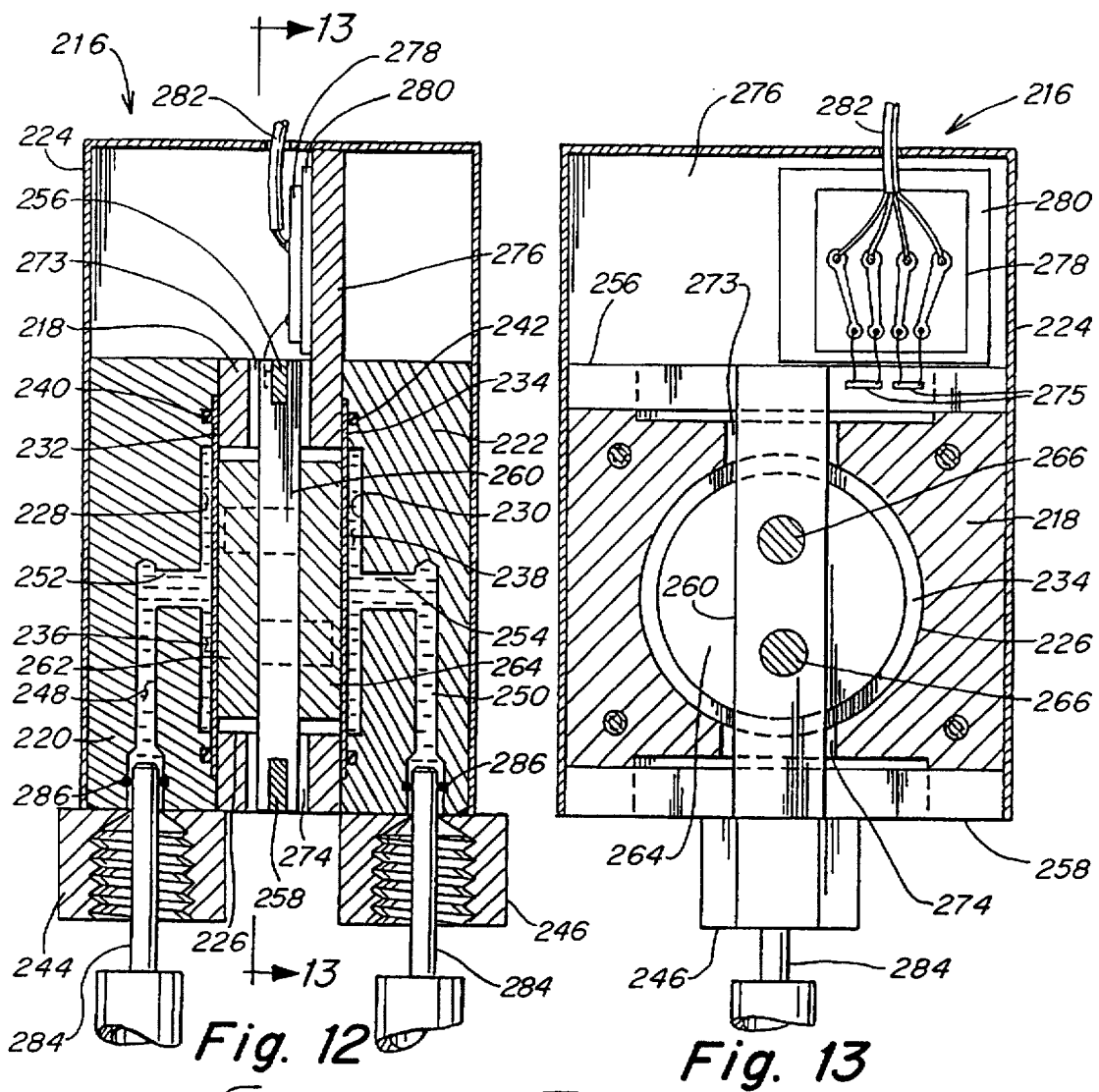
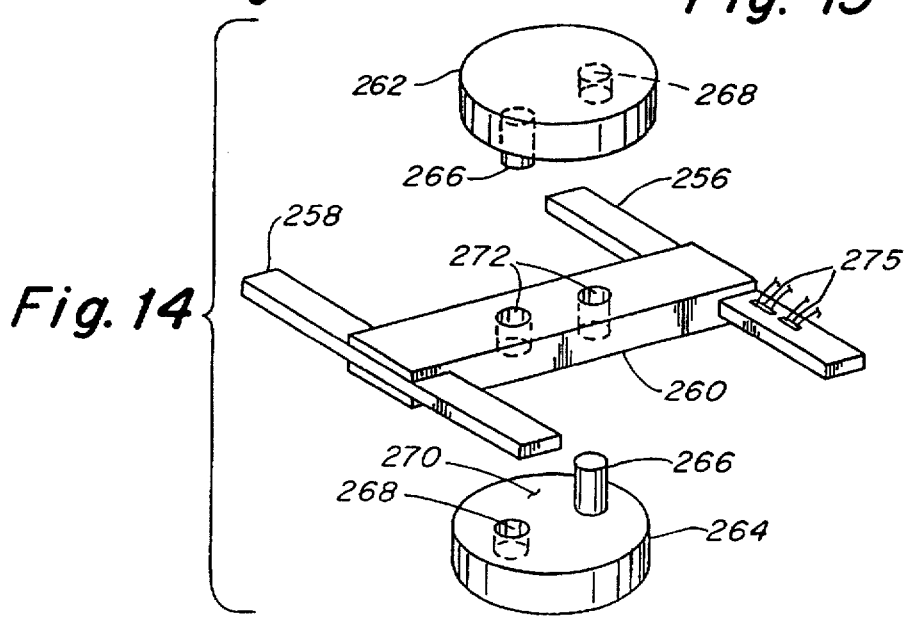
Fig. 12  Fig. 13
Fig. 14

DIFFERENTIAL PRESSURE TRANSDUCER

BACKGROUND OF THE INVENTION

1. Field of the Invention

The invention relates to pressure transducers, and more particularly to differential pressure transducers.

2. Discussion of the Related Art

A differential pressure transducer is conventionally used to measure a pressure differential between two pressure sources. This pressure differential is normally defined as the pressure at one source subtracted from the pressure at another source. The pressure at each source may also be referred to as line pressure. Some conventional differential pressure transducers contain a sensing element that is located between two separate pistons, each of which acts as a force collector. Each of the pistons is independently displaced in response to a pressure at one of the two volumes to which the transducer is exposed. The sensing element provides an electrical output indicative of the combined displacement of the two pistons by translating the displacement difference to an electrical signal. This electrical output is thus indicative of the pressure differential between the two volumes. Since it is necessary to locate the actual sensing element between the two opposing pistons, construction of these transducers is complex, and the resulting transducers are expensive.

A pressure transducer typically has an operating range over which the transducer will provide an electrical output indicative of the differential pressure. When the differential pressure approaches the limits of the operating range, any further increase in differential pressure beyond the operating range limits will not produce any further change in the electrical output of the transducer. Therefore, mechanical protection is conventionally provided to prevent damage to the sensing elements and other elements within the transducer as a result of, for example, excess movement of the elements in response to a high differential pressure. This protection, which is called overload protection, is provided for each of the two force collectors and it is typically complex and costly.

A differential pressure transducer should preferably provide zero output when the differential pressure is zero. This condition is referred to as maintaining line balance. Conventionally, line balance is achieved using precision parts and making adjustments to the transducer, which is expensive and time consuming.

Differential pressure transducers generally are classified according to cost, performance, and application environment. The application environment is conventionally classified as severe or benign with respect to both the pressure medium and the ambient conditions to which the transducer will be exposed. An example of a severe pressure medium is a hot, corrosive fluid, as compared to a more benign pressure medium such as air. Examples of severe ambient conditions include high shock and vibration levels, high temperatures, and high differential pressures. The performance of such transducers is typically represented by an operating range and an accuracy, in which the accuracy represents a percentage of the operating range. The value of the accuracy means that the electrical output represents a pressure differential that is within this percentage of the overall operating range. Generally, more expensive transducers have a higher performance or can withstand a more severe application environment.

A first type of differential pressure transducer, generally the most expensive, is typically a large, stainless steel device composed of many precision machined parts. Two opposing pistons are provided, with a sealing diaphragm between each piston and the volume to which the piston responds. Each piston is independently displaced to act on a sensing element in response to the pressure to which it is exposed. The sensing element is conventionally positioned between the separate pistons making it very difficult to assemble the transducer and then to access the sensing element when the transducer is assembled. This type of transducer requires many cycles of testing, adjustment, and retesting to be properly balanced and calibrated. Additionally, overload protection is usually provided by a very tight tolerance back-up plate that is located behind each of the sealing diaphragms. These transducers typically have an accuracy in the range of 0.10 to 0.25%, and a pressure differential operating range of a few psi (pounds per square inch) with a line pressure of approximately 1000 psi. This type of transducer can be used with severe fluid in a severe environment.

A second type of transducer, normally less expensive than the first type and the more common type currently used, typically features a micromachined silicon chip sensor mounted in a chamber that is filled with silicon oil. The chamber normally features multiple hydraulic paths to transfer the pressure force from two opposing thin isolation diaphragms. These hydraulic paths may be very complex, and therefore expensive to machine. Additionally, the sensor is immersed in the oil making accessibility to the sensor virtually impossible after assembly. The transducer requires extensive sealing to prevent oil from leaking from the housing. Further, all air must be evacuated from the oil chamber to remove air pockets that could adversely affect the accuracy of the transducer. Overload stops are provided by micromachining parts to achieve precise dimensions which limit the travel of the diaphragms to prevent damage to the diaphragms. Normally, the maximum line pressure for this type of transducer is approximately 500 psi. This type of transducer can also be used with severe pressure media in a severe application environment.

The third type of transducer is normally the lowest cost of the three types. This type features a bare silicon chip sensor with one side exposed to the pressure of a dry pressure media and the other side exposed to atmospheric pressure. Therefore, two transducers generally are required to measure the pressure differential between source pressures because each transducer measures the source pressure relative to the atmosphere. Additionally, the accuracy of the differential pressure measurement depends on the combined accuracy of the two transducers. These products typically are used to measure pressures below 200 psi in a benign environment.

Therefore, there is a need for a differential pressure transducer that eliminates many of the disadvantages associated with known transducers and which can accurately measure pressure differentials at a relatively less expensive cost using less complex parts and manufacturing processes.

SUMMARY OF THE INVENTION

In an illustrative embodiment of the invention, a differential pressure transducer is provided for measuring a pressure differential between a first pressure source and a second pressure source, the first pressure source having a first pressure and the second pressure source having a second pressure. The differential pressure transducer includes a displacement element having a first end and a second end and a sensing element coupled to the displacement element.

The displacement element is constructed and arranged to move in a linear direction in response to the pressure differential between the first and second pressure sources when the first and second ends are subjected to the first and second pressures. The sensing element is constructed and arranged to be deflected by the displacement element and to provide a signal that is proportional to the movement of the displacement element.

In another illustrative embodiment of the invention, a differential pressure transducer is provided for measuring a pressure differential between a first pressure source and a second pressure source, the first pressure source having a first pressure and the second pressure source having a second pressure. The differential pressure transducer comprises a body having first and second plenums, a displacement element disposed between the first and second plenums, and a displacement sensing unit connected to the displacement element. The body is constructed and arranged to be fluidly coupled to the first and second pressure sources so that the first plenum is at the first pressure and the second plenum is at the second pressure. The displacement element has first and second ends, wherein the first end is disposed adjacent the first plenum and the second end is disposed adjacent the second plenum. The displacement element is constructed and arranged to move along a single axis relative to the body in response to the first and second pressures. The displacement sensing unit is constructed and arranged to respond to the movement of the displacement element to provide a signal in proportion to the pressure differential.

In a further illustrative embodiment of the invention, a displacement sensing unit is provided for use in a pressure transducer. The displacement sensing unit comprises at least one sensing beam having first and second ends, and a cross beam connected to the at least one sensing beam intermediate the first and second ends. The cross beam is constructed and arranged to deflect the at least one sensing beam when the cross beam is moved in response to pressure.

In yet another illustrative embodiment of the invention, a differential pressure transducer is provided for measuring a pressure differential between a first pressure source and a second pressure source. The differential pressure transducer comprises displacement means for transforming the pressure differential into a linear displacement proportional to the pressure differential, and measurement means for measuring the displacement of the displacement means.

BRIEF DESCRIPTION OF THE DRAWINGS

It should be understood that the drawings are provided for the purpose of illustration only and are not intended to define the limits of the invention. The foregoing and other objects and advantages of the present invention will become apparent with reference to the following detailed description when taken in conjunction with the following drawings in which:

FIG. 12 is a cross-sectional side view of a further illustrative embodiment for a differential pressure transducer of the present invention;

FIG. 13 is a cross-sectional view of the differential pressure transducer of FIG. 12 taken along section line 13—13 in FIG. 12;

FIG. 14 is an exploded perspective view of an illustrative embodiment for a displacement sensor and force collectors incorporated in the differential pressure transducer of FIG. 12;

DETAILED DESCRIPTION OF THE INVENTION

Figure 1:
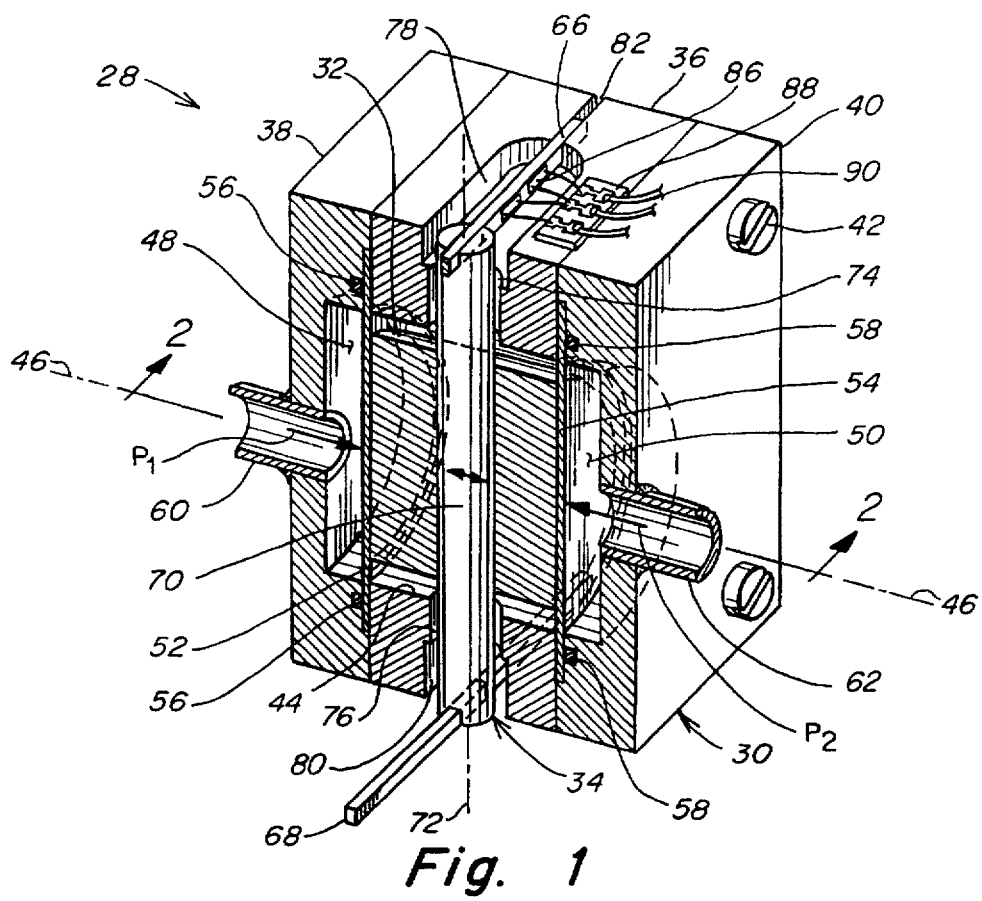
FIG. 1 is a partially fragmented perspective view of an illustrative embodiment for a differential pressure transducer of the present invention.

An illustrative embodiment of a differential pressure transducer according to the present invention is shown in FIGS. 1-4. The differential pressure transducer 28 includes a housing 30, a displacement element 32 disposed within the housing 30, and a displacement sensing unit 34 connected to the displacement element 32. The housing 30 includes a body 36 and a pair of end plates 38, 40 disposed on opposite faces of the body 36. The end plates 38, 40, which are to be coupled to pressure sources, can be mounted to the body 36 using fasteners 42, such as screws, bolts, nuts and the like.

The displacement element 32, which may also be referred to as a force collector, is coaxially disposed within a bore 44 that extends through the body 36. The displacement element 32 is adapted to move in a linear direction along the axis 46 of the bore 44 in response to a pressure differential between the end plates. In an exemplary embodiment, the displacement element 32 can be a piston having opposing ends which are simultaneously subjected to opposing pressures in the end plates 38, 40.

To cause the displacement element 32 to move in response to a pressure differential, each end plate 38, 40 includes an open faced cavity which forms a plenum chamber 48, 50 when the end plates are connected to the sensor body 36. A pressure responsive diaphragm 52, 54 is disposed between each end plate 38, 40 and the body 36 so that pressure within each plenum can coact on each end of the displacement element 32 which is disposed between and engages the diaphragms 52, 54. In one embodiment, the length of the displacement element 32 should be equal to the length of the body 36 so that the ends of the displacement element are coplanar with the faces of the body. The diaphragms 52, 54 seal the plenums 48, 50 to maintain a pressure differential across the transducer and to ensure that pressurized media does not penetrate into the body 36. The diaphragms can be made from a thin metal that can be heat fused to the end plates to provide a pressure seal. Alternatively, elastomeric gaskets, such as O-rings 56, 58, can be provided in the end plates 38, 40 to surround the plenum chambers 48, 50 so that the pressurized media does not leak from the plenums and the transducer. For use in more benign environments, the diaphragms could be made from a polymeric material such as kapton.

Pressurized media can be delivered to the plenum chambers 48, 50 through hydraulic connections 60, 62 which fluidly couple the plenums to user selected pressure sources in an external hydraulic circuit between which the user desires to measure the pressure differential. In the illustrative embodiment, the hydraulic connections 60, 62 include tubing which can be heat fused to the cover plates using brazing or welding techniques. However, it is to be appreciated that hydraulic connections to the transducer can be achieved using various types of connections including threaded hydraulic connectors.

As illustrated in FIG. 1, one end of the displacement element 32 can be subjected to a first pressure $P_1$ in the first plenum 48 and the other end of the displacement element can be simultaneously subjected to a second pressure $P_2$ in the second plenum 50. The pressure $P_1$, $P_2$ in each plenum 48, 50 exerts a force on the corresponding end of the displacement element 32 that is equal to the pressure multiplied by the effective area of the displacement element. In general, the forces exerted on the displacement element by the pressure are in a direction substantially opposite each other, although this is not necessary. To allow free axial movement of the displacement element 32, the displacement bore 44 has a diameter that is larger than the diameter of the displacement element so that an annular gap 64 is created between the displacement element 32 and the body 36. The displacement element 32 is effectively suspended in the bore 44 by the displacement sensing unit 34. The annular gap 64 establishes an effective area, over which pressure is applied, that is equal to the average of the bore 44 cross-sectional area and the displacement element 32 cross-sectional area. It is desirable that the effective area at each end of the displacement element 32 be substantially equal to each other to accurately measure the pressure differential. The use of a single force collector disposed in a continuous bore is an effective means of providing such accuracy because maintaining a substantially constant diameter along the length of a single part can be achieved relatively easily.

Figure 2:
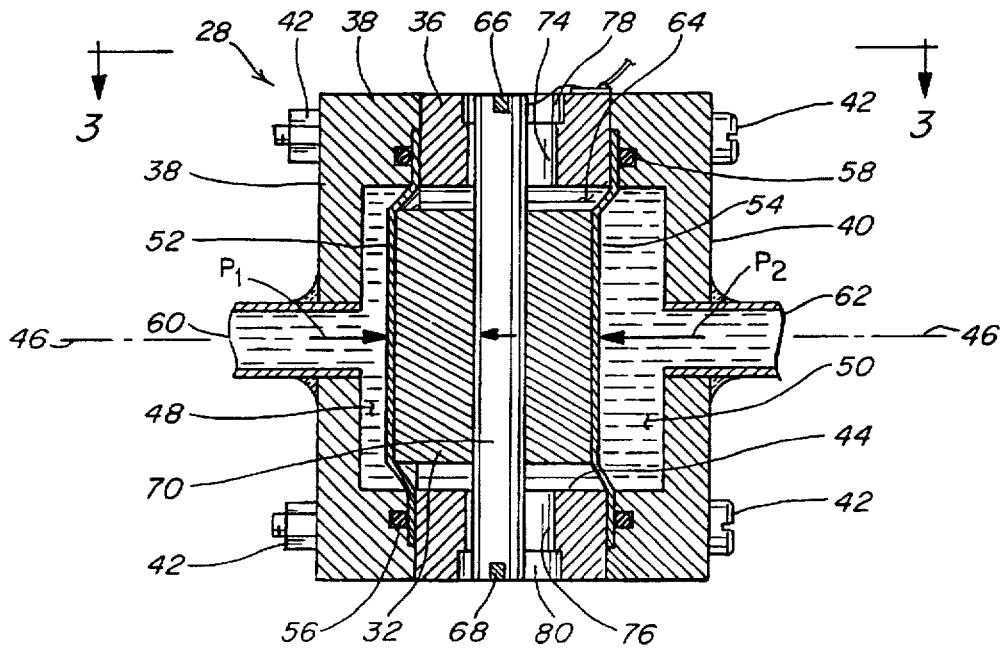
FIG. 2 is a cross-sectional side view of the differential pressure transducer of FIG. 1 taken along section line 2—2 in FIG. 1.
Figure 3:
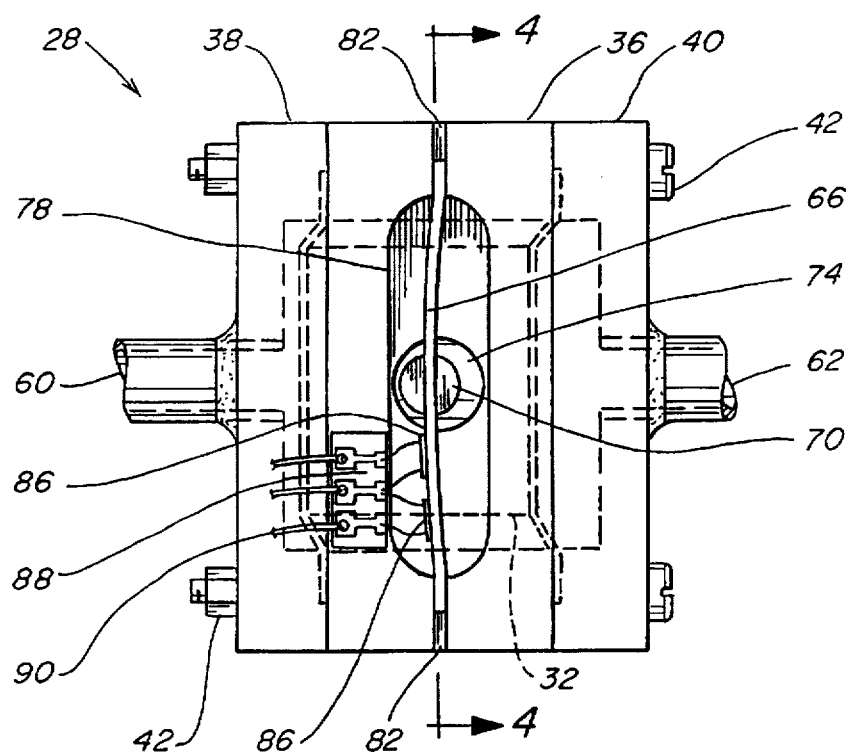
FIG. 3 is a top plan view of the differential pressure transducer of FIG. 1 as seen along view line 3—3 in FIG. 2.
Figure 4:
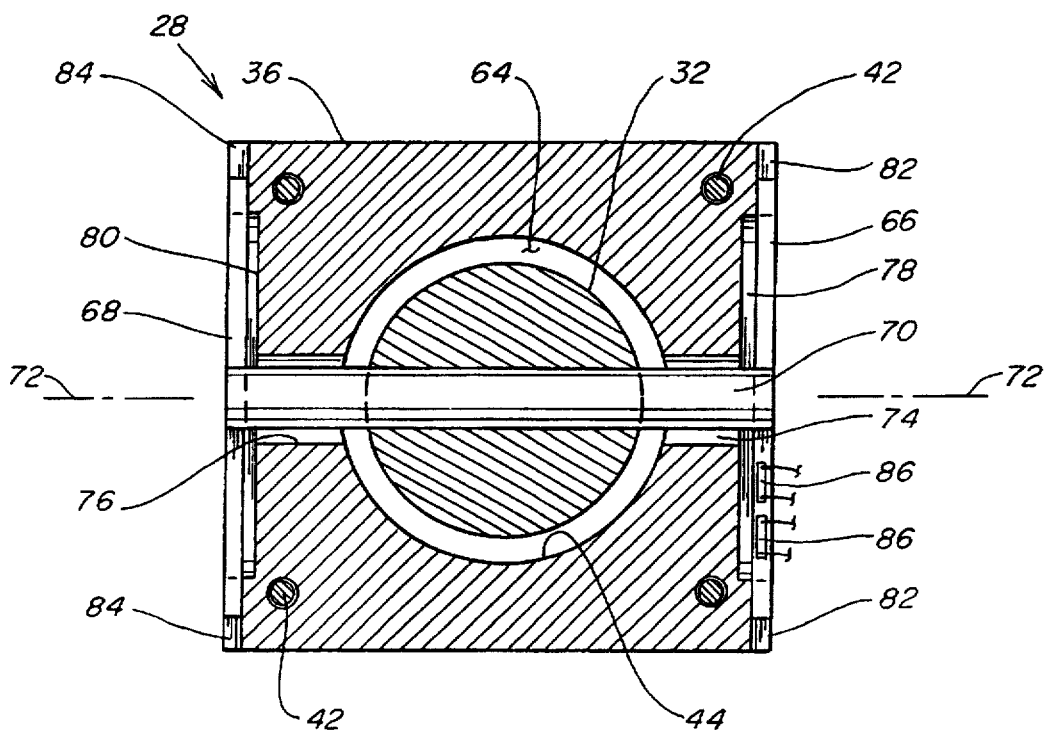
FIG. 4 is a cross-sectional transverse view of the differential pressure transducer of FIG. 1 taken along section line 4—4 in FIG. 3.

When the first pressure $P_1$ is equal to the second pressure $P_2$ as shown in FIG. 1, the pressure differential across the displacement element 32 is zero and the opposing forces exerted on each end of the displacement element are equal so that the displacement element 32 does not move relative to the body 36. However, when the first pressure $P_1$ does not equal the second pressure $P_2$, the end of the displacement element 32 exposed to the higher pressure is subjected to a higher force resulting in the displacement element 32 being moved along the axis 46 of the bore 44 toward the plenum having the lower pressure. As illustrated in FIG. 2, when the second pressure $P_2$ is greater than the first pressure $P_1$, the displacement element 32 is moved along the bore axis 46 toward the first plenum 48.

As illustrated, the displacement sensing unit 34 is connected to the displacement element 32 and is arranged to be displaced by the displacement element 32 in response to a pressure differential. The displacement sensor 34 includes a pair of sensing elements 66, 68 and a force transfer beam 70 which interconnects the first sensing element 66 and the second sensing element 68. The force transfer beam 70 extends through and is connected to the displacement element 32 along an axis 72 that is perpendicular to the bore axis 46. Each end of the force transfer beam 70 extends through opposing clearance holes 74, 76 and into elongated cavities 78, 80 provided on opposing faces of the body 36. Each end of the force transfer beam 70 is connected to a sensing element 66, 68 which is disposed within and along the length of each cavity 78, 80. Each sensing element 66, 68 is an elongated member having a length that is greater than the length of the cavities 78, 80. The ends of each sensing element 66, 68 are received within and affixed to slots 82, 84 that are provided on the body 36 at opposing ends of the cavities 78, 80. Preferably, the connections between the displacement element 32 and the force transfer beam 70, the sensing elements 66, 68 and the force transfer beam 70, and the sensing elements 66, 68 and the body 36 are made by heat fusing, such as brazing, the parts to each other. However, it should be understood that other fastening techniques, such as adhesive bonding, can be used to interconnect the pieces to each other.

When the displacement element 32 is moved in response to a pressure differential as described above, the movement is transmitted from the displacement element 32 to the sensing elements 66, 68 through the force transfer beam 70. Accordingly, the differential pressure exerted on the displacement element 32 produces a displacement force that is transmitted to the sensing elements 66, 68 which can be configured to deflect in a predetermined manner in response to the magnitude of the force. The deflection of the sensing elements 66, 68 can be measured and converted to the pressure differential being applied across the transducer.

In an illustrative embodiment, the sensing elements 66, 68 are configured to be sensing beams having ends which are rigidly fixed to the sensor body 36 at each end of the cavities 78, 80. The depth of the cavities should be greater than the height of the sensing beams to ensure that the sensing beams deflect freely when subjected to a displacement force. The force transfer beam 70, which may also be referred to as a cross-beam, is rigidly connected to the center of the sensing beams 66, 68. Preferably, the cross-beam 70 has a stiffness much greater than the stiffness of the sensing beams so that substantially all the displacement of the displacement element 32 is transmitted directly to the sensing beams 66, 68. However, it should be understood that the cross-beam 70 itself may experience some deflection without decreasing the performance of the pressure transducer.

Because the bending characteristics of a beam can be accurately predicted based upon a particular beam configuration, such as a square or rectangular cross-section as illustrated, it is possible to determine the amount of force being applied to the sensing beams 66, 68 by measuring the magnitude of strain that is produced in the sensing beams when being deflected by the displacement element 32. Deflecting the center of the sensing beams 66, 68, when the ends of the sensing beams are rigidly fixed to the sensor body 36, creates areas of strain in the beam which are partly in tension and partly in compression. An extensometer 86, such as a semiconductive or piezoelectric strain gauge, can be mounted to selected areas of the sensing beams 66, 68 to measure the magnitude of the strain in the beams and provide an electrical signal that is proportional to the magnitude of the strain. The electrical signal can then be carried from the pressure transducer to monitoring equipment (not shown) using connection devices, such as a printed wiring board 88 and electrical wire 90. The monitoring equipment can be arranged to convert the electrical signal into a pressure differential measurement. As illustrated in FIGS. 1–4, an extensometer 86 is mounted to one end of the first sensing beam 66. However, it should be understood that other measurement devices may be used and such devices can be mounted to one or both sensing beams and to various locations on the sensing beams. Additionally, various cross-sectional shapes can be used for the sensing beams and cross beam. In particular, a triangular shaped sensing beam could be used in which a constant stress is developed along the length of the beam when deflected. This advantageously allows the strain gauge to be placed anywhere along the beam.

Because a differential pressure transducer may be exposed to a high line pressure or high differential pressure, for example 10 to 20 times the normal operating pressure range of the transducer, overload protection should be provided to ensure that the differential pressure transducer is not damaged when exposed to these high pressures.

In an illustrative embodiment as shown in FIGS. 1–4, the clearance holes 74, 76 for the force transfer beam 70 can provide a controlled clearance which limits the deflection of the displacement element 32 when the force transfer beam 70 engages the wall of the clearance holes 74, 76. Limiting the amount of movement of the force transfer beam 70 also limits the deflection of the sensing elements 66, 68 thereby preventing the sensing elements from being damaged when the transducer is subjected to a very high pressure differential. In an exemplary embodiment, the diameter of the clearance holes 74, 76 is 0.002 inches larger than the diameter of the force transfer beam 70. However, it should be understood that the overload protection clearance can be varied to correspond to the particular operating ranges of the transducer. As described above, the overload protection does not require backup plates such as those used in the conventional art. Therefore, the design of the overload protection is simpler, the number of parts may be reduced, and the resulting cost of the transducer may be less. However, if desired, conventional backup plates may be used in conjunction with the clearance holes 74, 76 in providing overload protection for the transducer.

In another illustrative embodiment of the displacement sensor (not shown), the force transfer beam may be used in conjunction with only one of the sensing elements 66, 68. In this embodiment, one end of the force transfer beam 70 may be rigidly connected to the sensing element 66 as described above and the opposite end of the force transfer beam may be pivotally connected to the sensor body 36. An advantage of using a single sensing element is the simplification of the displacement sensor due to fewer parts. The single sensing element should be stiffer than each of the dual sensing elements 66, 68 described above so that the deflection of the single sensing element is approximately equal to the deflection of each sensing element 66, 68 when subject to the same differential pressures.

In accordance with one illustrative embodiment, the manufacturing process and operation of the differential pressure transducer is simplified when compared to the conventional art. For example, the design and implementation of a single displacement element may generally be cheaper and less complex than a corresponding pressure transducer using two displacement elements simply because there are less parts to manufacture and assemble. Additionally, the elimination of oil greatly reduces the complexity of the transducer and simplifies assembly. Further, a pressure transducer using a single displacement element is easier to assemble and maintain because the sensing elements may now be located in a more easily accessible position on the transducer. Moreover, when the pressure differential across the transducer is zero, the displacement element will be neutrally positioned in the transducer so that no force is applied to the sensing elements thereby eliminating the need for additional line balancing.

Figure 5:
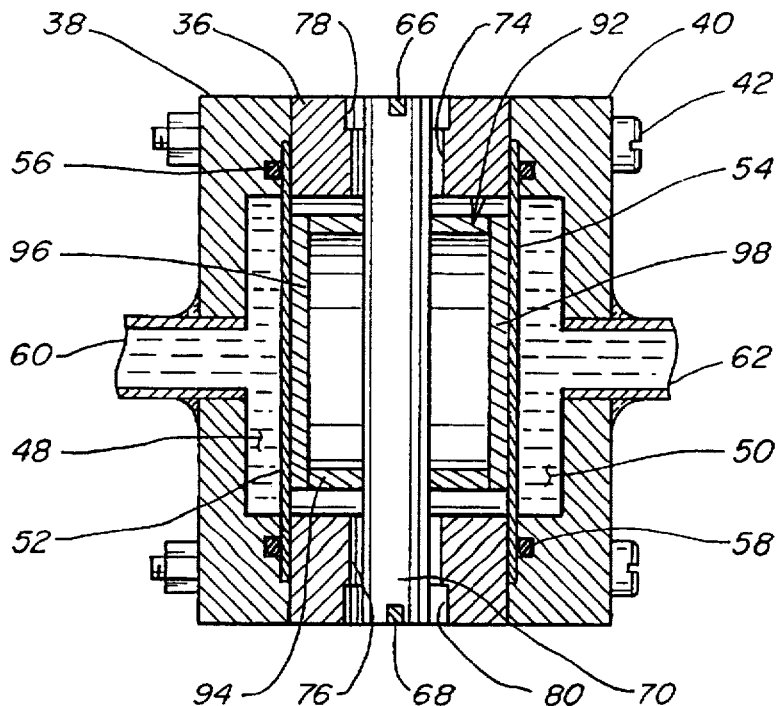
FIG. 5 is a cross-sectional view of another illustrative embodiment of a differential pressure transducer of the present invention.

In another illustrative embodiment of a differential pressure transducer as shown in FIG. 5, parts of the transducer that are common to FIGS. 1–4 bear the same reference characters. In general, the differential pressure transducer in FIG. 5 is the same as the transducer described above with the exception of the displacement element. In the illustrative embodiment shown in FIG. 5, the displacement element 92 is a hollow member such as a hollow piston. The displacement element 92 can include a tubular body 94 and a pair of end caps 96, 98 mounted to opposing ends of the tubular body 94 to seal the tubular body and form the hollow displacement member 92. A hollow displacement member advantageously decreases the weight and increases the natural frequency of the displacement member 92, thereby reducing the adverse effects of vibration and shock, and at the same time becomes more responsive to changes in pressure differentials across the transducer. It should be understood that other means of advantageously reducing the weight of the displacement element may be used including making the displacement element from lightweight materials such as a polymer.

Figure 6:
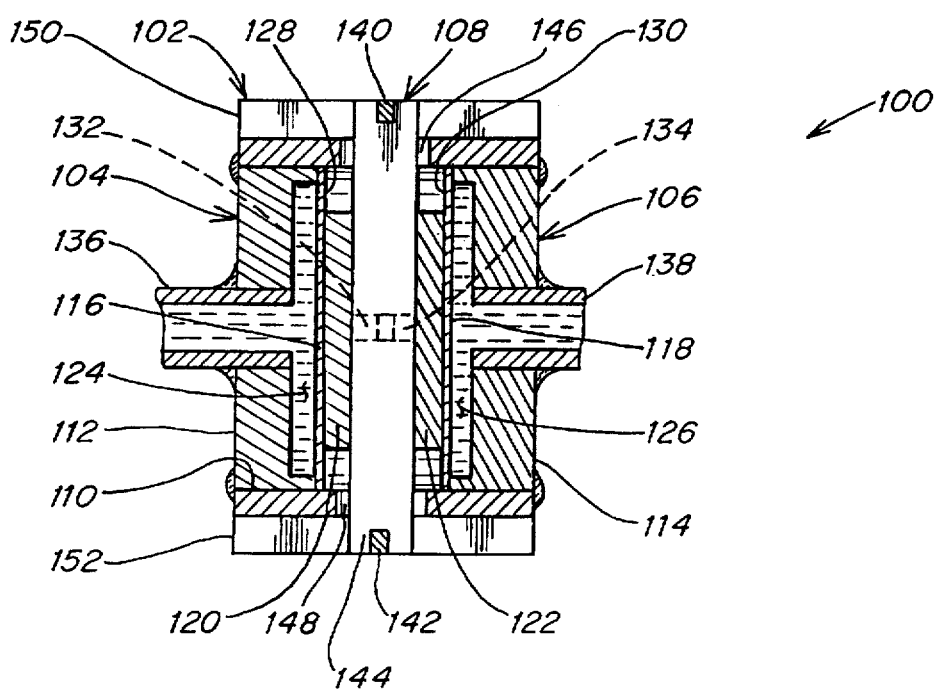
FIG. 6 is a cross-sectional side view of a further illustrative embodiment for a differential pressure transducer of the present invention.
Figure 7:
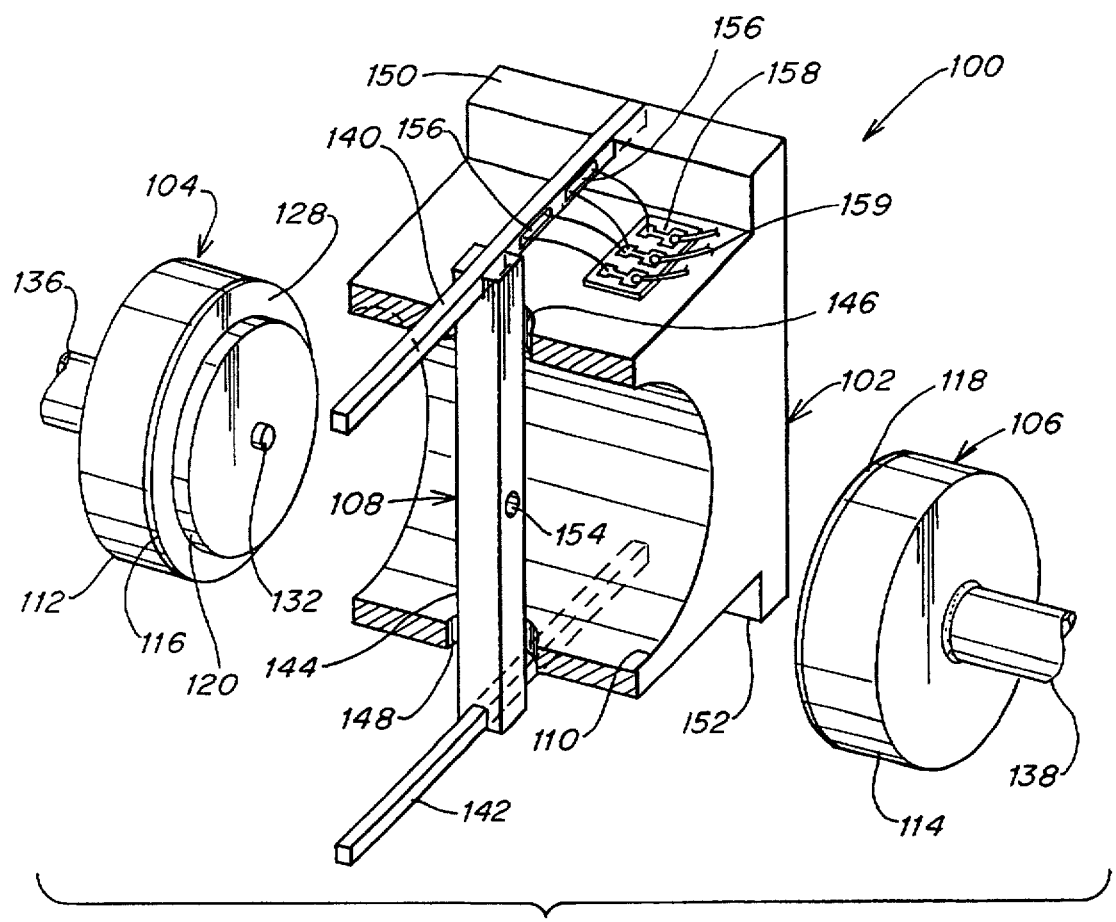
FIG. 7 is an exploded fragmentary perspective view of the differential pressure transducer of FIG. 6.

A further illustrative embodiment of a differential pressure transducer is shown in FIGS. 6 and 7. In this embodiment, the differential pressure transducer 100 includes a housing 102, a pair of pressure port modules 104, 106, and a displacement sensing unit 108. Similar to the transducer described above, a bore 110 axially extends through the housing 102. The first and second pressure port modules 104, 106 are inserted into opposing ends of the bore 110 to engage the displacement sensing unit 108 disposed therebetween. Pressure is applied to each of the pressure port modules 104, 106 from separate pressure sources. A pressure differential between the first and second pressure port modules 104, 106 is transmitted to the displacement sensing unit 108 and is converted into an electrical signal in a manner described above.

The pressure modules 104, 106 each includes a pressure port body 112, 114, a diaphragm 116, 118, and a force collector 120, 122. Each pressure port body 112, 114 includes a cavity which functions as a plenum 124, 126 between the body and the diaphragm 116, 118. Each diaphragm 116, 118, which is a thin metal, low force diaphragm, can be attached to the pressure port body using a metal fusion process, such as welding or brazing, to provide a pressure seal between the diaphragm and the body. Similarly, each force collector 120, 122 can be attached to the opposite face of the diaphragm. Although the force collectors are initially produced as separate parts, they are heat fused or bonded to the displacement sensing unit in a manner such that the force collectors effectively function as the single displacement element described above. This arrangement improves the manufacturability of the transducer. The collectors can be accurately controlled so that the effective areas of each pressure module are substantially equal.

The force collectors 120, 122 have a diameter that is smaller than the diameter of the pressure port plenums 124, 126 so as to form an unsupported annular portion 128, 130 of the diaphragm that surrounds the force collector. The annular portions 128, 130 of the diaphragms 116, 118 allow the force collectors 120, 122 to be readily displaced in an axial direction along the bore 110 in response to pressure differentials across the transducer. A centering pin 132, 134, which axially protrudes from the face of each force collector 120, 122, aligns the pressure port modules with the displacement sensing unit 108. The annular portions 128, 130 of the diaphragms 116, 118 should be configured such that the diaphragm will not burst when subjected to anticipated pressures and remains flexible so as not to absorb some of the pressure force. Each of the pressure port modules 104, 106 can be fluidly connected to a pressure source (not shown) using tubing 136, 138 that can be heat fused or bonded to the pressure port body 112, 114 along the axis of the bore 110.

Similar to the illustrative embodiment described above in FIGS. 1-4, the displacement sensing unit 108 shown in FIGS. 6 and 7 includes a first sensing beam 140, a second sensing beam 142, and a cross-beam 144 that interconnects the first and second sensing beams. The cross-beam 144, which can also be referred to as a force transfer beam, extends in a vertical direction through clearance holes 146, 148 disposed on opposing sides of the bore 110. Each end of the cross-beam 144, which extends out from the housing 102, is connected to one of the first and second sensing beams 140, 142. Each end of the first and second sensing beams 140, 142 is rigidly connected to opposing support walls 150, 152 provided on each side of the housing 102. The sensing beams are positioned to extend across the housing transverse to the bore axis. A centering hole 154 is provided on the cross-beam 144 to receive the center pins 132, 134 and align the pressure port modules 104, 106 with the displacement sensing unit 108. As illustrated, the cross-beam 144 has a generally square cross-section which provides a greater contact surface between the cross-beam and the force collectors 120, 122 when compared to a circular cross-beam. However, it is to be understood that other shapes can be utilized for the cross-beam 144 and the first and second sensing beams 140, 142 as described above.

The displacement sensing unit 108 operates in a manner similar to the transducer described above. When the pressure transducer 100 is subjected to a pressure differential between the pressure port modules 104, 106, the cross-beam 144 is axially displaced along the bore 110 toward the plenum 124, 126 having the lower pressure. The displacement of the cross-beam 144 in turn deflects the first and second sensing beams 140, 142 thereby inducing a strain within the sensing beam which can be measured by a device, such as a strain gauge 156, mounted on the sensing beam. The strain gauge 156 produces an electrical signal in proportion to the pressure differential which is transmitted to pressure monitoring equipment (not shown) to be converted into a pressure differential measurement. As shown in FIG. 7, the strain gauges 156 can be connected to a printed wiring board 158 mounted on the housing 102 which in turn can be connected to the pressure monitoring equipment through a cable or wires 160. The clearance holes 146, 148 should be sized relative to the cross-beam 144 so as to limit the axial displacement of the cross-beam 144 to provide overload protection.

Figures 8, 9:
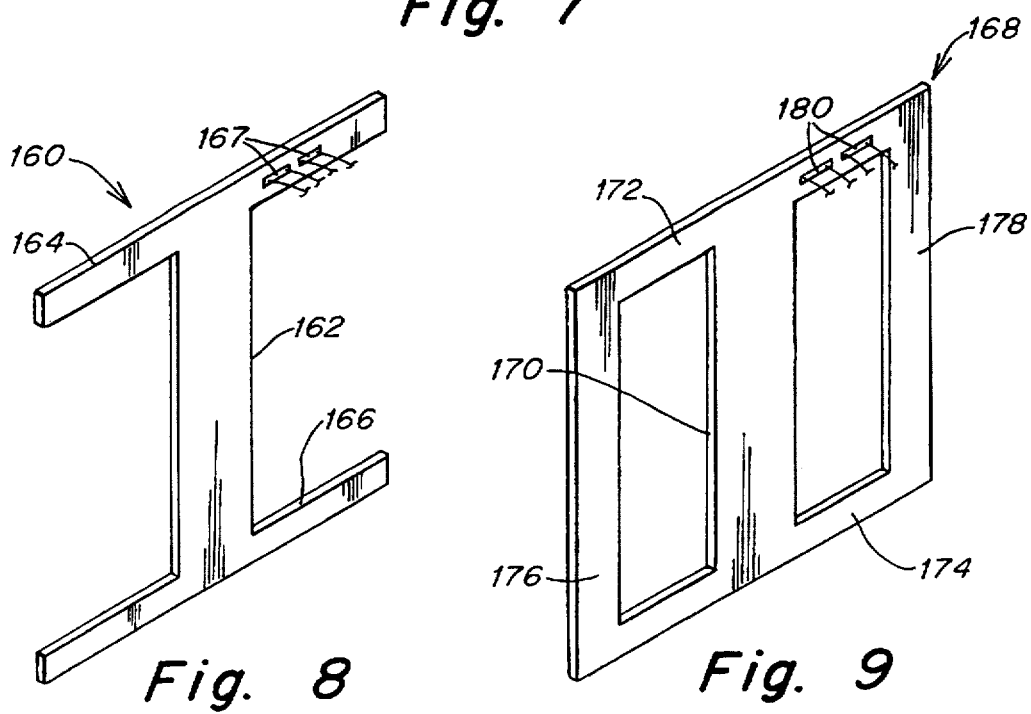
FIG. 8 is a perspective view of an alternate embodiment for a displacement sensor of the present invention.
FIG. 9 is a perspective view of another alternate embodiment for a displacement sensor of the present invention.
Figure 10:
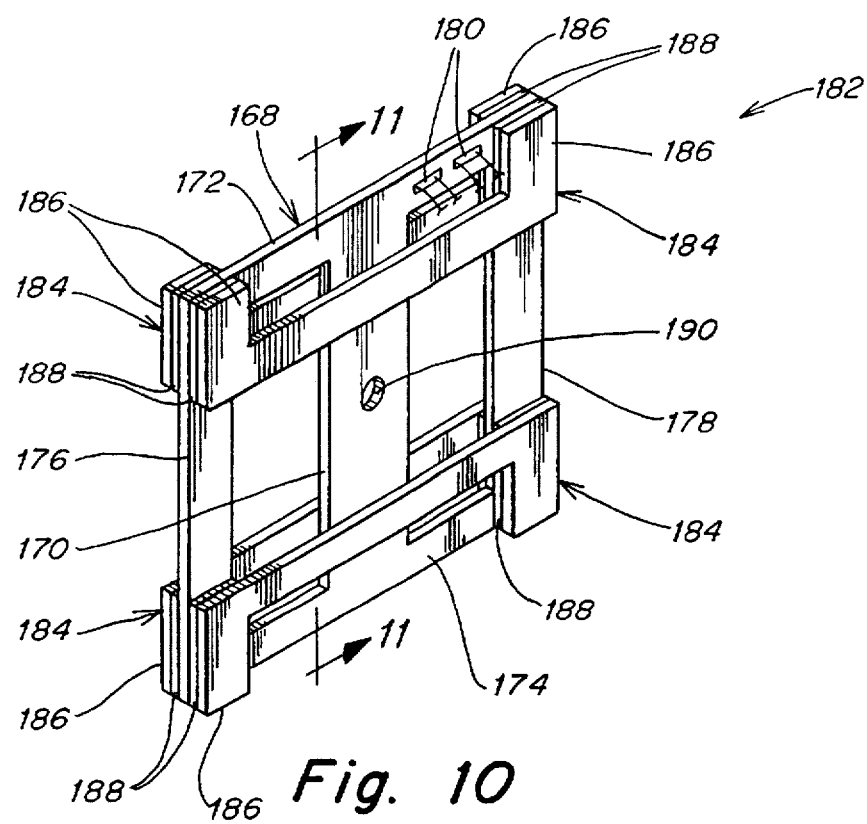
FIG. 10 is a perspective view of a further alternate embodiment for a displacement sensor of the present invention.

FIGS. 8-10 illustrate other alternate embodiments for a displacement sensing unit of the present invention. In FIG. 8, the displacement sensing unit 160 is a unitary stamped part having an I-beam configuration with combines the functionality of the individual cross-beam and sensing beams described above. The displacement sensing unit 160 includes a cross-beam 162 disposed between and interconnecting a first sensing beam 164 and a second sensing beam 166.

The first and second sensing beams are parallel to each other and the cross-beam 162 is connected to the center portion of each sensing beam. Strain gauges 167 can be mounted on the sensing beams to measure the strain caused by deflection of the sensing beams. When used in a differential pressure transducer, each end of the first and second sensing beams 164 is rigidly attached to the transducer housing or body as described above.

To ensure that the displacement of the force collectors described above is properly transmitted to the sensing beams 164, 166, the deflection ratio of the cross-beam 162 should be large relative to the deflection ratio of the sensing beams. The deflection ratio is the ratio that a beam will deflect when subjected to a particular force. For example, if the deflection ratio of the cross-beam 162 were to be infinite with respect to the sensing beams 164, 166, the displacement of the force collectors would be entirely transmitted to the sensing beams. In an exemplary embodiment, the cross-beam 162 has a deflection ratio that is at least twenty times the deflection ratio of the first and second sensing beams 164, 166. The unitary displacement sensing unit 160 offers potential advantages over the displacement sensing units described above including the reduction in the number of parts to be fabricated and the assembly time for a pressure transducer.

In the embodiment illustrated in FIG. 9, the displacement sensing unit 168 is also a unitary stamped part which combines the functionality of the individual cross-beam and sensing beams described above. The displacement sensing unit 168 includes a cross-beam 170, a first sensing beam 172 and a second sensing beam 174 which are configured to form an I-beam configuration similar to the displacement sensing unit 160 described above. However, the displacement sensing unit 168 also includes a first support beam 176 and a second support beam 178 that are parallel to and disposed on opposite sides of the cross-beam 170. The first and second support beams 176, 178 interconnect and support the ends of the first and second sensing beams 172, 174. Strain gauges 180 can be mounted in desired locations on the first and second sensing beams.

In the embodiment illustrated in FIG. 10, a displacement sensing assembly 182 is provided which combines an overload protection with a displacement sensing unit. The displacement sensing assembly 182 includes the displacement sensing unit 168 described above and a plurality of support plates 184 which are laminated to each side of the displacement sensing unit 168 adjacent the sensing beams 172, 174. As illustrated in FIG. 10, the support plates 184 are generally U-shaped having vertically extending end portions 186 which are laminated to opposing sides of each end of the first and second support beams 176, 178. To provide a convenient means for overload protection, shim stock 188 can be laminated between the end portions 186 of the support plates 184 and the first and second support beams 176, 178. The shim stock 188 spaces the support plates 184 a predetermined distance from the cross-beam 170, thereby permitting the cross-beam to be displaced an amount equal to the predetermined distance before engaging the support plates 184. A centering hole 190 can be provided on the across-beam 170 to align and attach force collectors on opposing sides of the sensing assembly. One of the support plates 184 may also be extended (not shown) beyond the envelope of the sensing assembly 182 to provide an area for mounting electronic circuits such as sensor signal conditioning and compensation.

Figure 11:
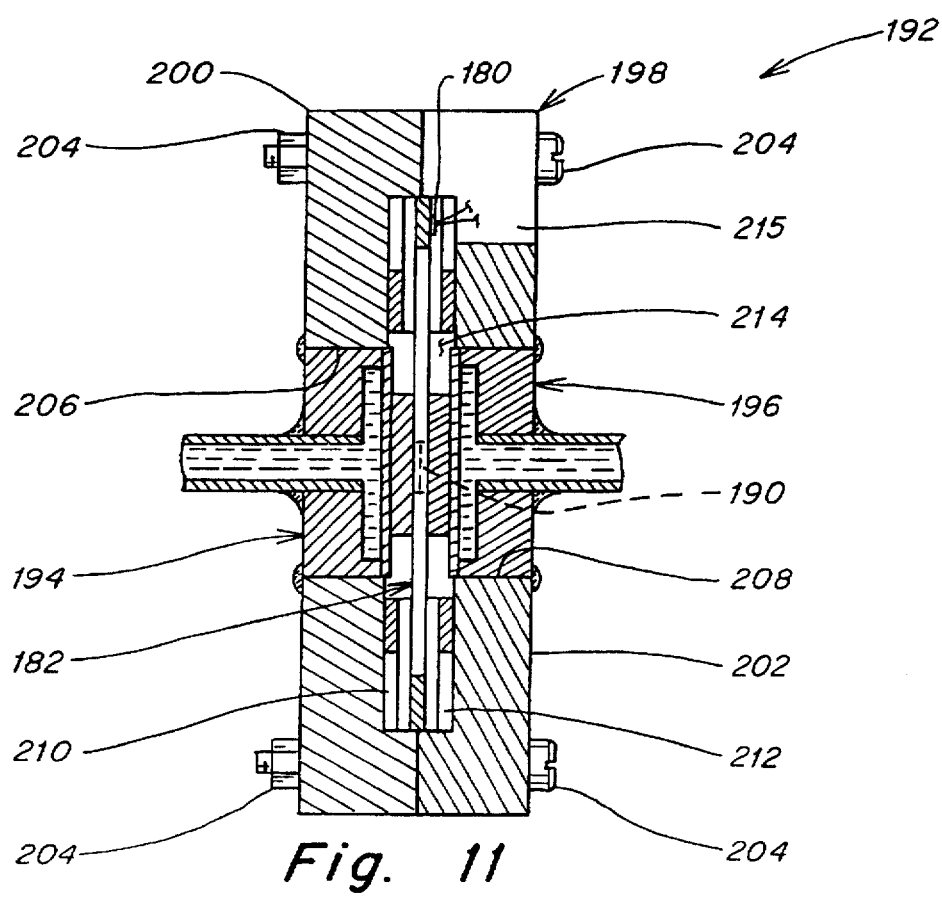
FIG. 11 is a cross-sectional side view of another illustrative embodiment for a differential pressure transducer incorporating the displacement sensor of FIG. 10.
Figure 15:
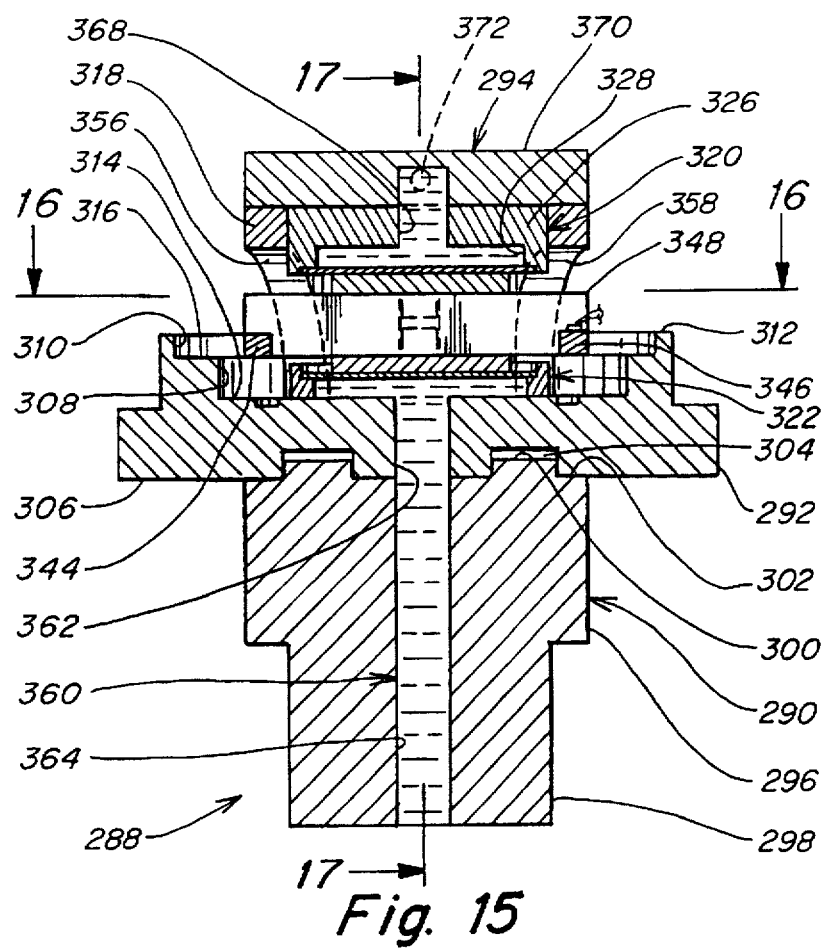
FIG. 15 is a cross-sectional elevational view of an alternate illustrative embodiment for a differential pressure transducer of the present invention.

FIG. 11 is an illustrative embodiment for a differential pressure transducer 192 incorporating the displacement sensing assembly 182 shown in FIG. 10. In this embodiment, the transducer 192 includes the displacement sensing assembly 182, a pair of pressure port modules 194, 196 and a housing 198. The housing 198 includes a first housing member 200 and a second housing member 202 which are secured to each other using fasteners 204 such as bolts, nuts and the like. Each housing member, 200, 202 includes a bore 206, 208 into which is mounted a pressure port module 194, 196 which can be heat fused or bonded to the housing member. The housing members also have open-face recesses 210, 212 which are disposed opposite to each other to form a cavity 214 when the housing members 200, 202 are secured to each other. The cavity 214 is adapted to receive and secure the displacement sensing assembly 182 in the housing between the pressure port modules 194, 196. The second housing member 202 can be provided with an opening 216 to allow easy access to the strain gauges 180 provided on the displacement sensing assembly 182.

As illustrated in FIG. 11, the pressure port modules 194, 196 can be configured to be similar to the modules described above in connection with FIG. 6. The centering hole 190 that is provided on the cross-beam 170 can receive the center pins 132, 134 (FIGS. 6 and 7) disposed on the force collectors to align the displacement sensing assembly 182 with the pressure port modules 194, 196 so the collectors can be rigidly attached to the sensing assembly.

Additional illustrative embodiments for various differential pressure transducers are shown in FIGS. 12–22. Each of the various transducers operates essentially in the same manner as described above for FIGS. 1–11 in that each of the transducers includes a displacement sensing unit having a sensing beam which is deflected in response to the deflection of a force collector due to a differential pressure across the transducer.

In the embodiment illustrated in FIGS. 12–14, a differential pressure transducer 216 is provided which is similar in operation and configuration to the illustrative embodiment shown in FIGS. 1–4. The major differences in the embodiment of FIGS. 12–14 being the use of individual force collectors mounted to opposite sides of the displacement sensing unit so as to function as a single displacement element, and the hydraulic connections to the pressure sources being disposed on the same side of the pressure transducer housing. As illustrated in FIGS. 12–14, the transducer includes a displacement body 218, a pair of pressure port plates 220, 222 mounted to opposite sides of the displacement body 218 and a transducer cover 224 enclosing the body 218 and pressure port plates 220, 222. As best shown in FIG. 13, the displacement body 218 and the pressure port plates 220, 222 have a generally square cross-section.

The displacement body 218 is provided with a bore hole 226 extending in an axial direction through the body between the pressure port plates 220, 222. Each pressure port plate has a circular open face cavity 228, 230 that is axially aligned with the bore hole 226. A pressure responsive diaphragm 232, 234 is disposed between each cavity and the bore hole to form plenum chambers 236, 238 which are fluidly coupled to separate pressure sources (not shown). O-ring seals 240, 242 can be provided between the diaphragms 232, 234 and the pressure port plates 220, 222 to ensure that pressure media does not leak from the plenum chambers. Each plenum 236, 238 is fluidly coupled to a connector 244, 246 which is attached to the bottom face of each pressure port plate 220, 222. A first fluid passage 248, 250 extends in a vertical direction through each pressure port plate 220, 222 from the connector 244, 246 to approximately the center axis of the bore hole 226 and plenums 236, 238. A second fluid passage 252, 254 extends in a horizontal direction along the bore hole axis between the first fluid passage 248, 250 and the plenum 236, 238.

As best shown in FIG. 14, an illustrative embodiment of the displacement sensing unit includes a first sensing beam 256, a second sensing beam 258, and a cross-beam 260 disposed between and interconnecting the center portion of each sensing beam which are arranged parallel to each other. A pair of identical force collectors 262, 264 are mounted to opposing sides of the cross-beam 260. Each force collector includes an alignment post 266 and a post receptacle 268 disposed on a face 270 of the force collector. The post 266 of each collector extends through adjacent holes 272 in the cross-beam 260 to be received within the receptacle 268 of the opposing force collector. The force collectors 262, 264 can be heat fused or bonded to each other and the cross-beam 260 so they function as a single displacement element. Each force collector should have a diameter that is less than the diameter of the bore hole 226 so that the force collectors can be freely displaced in a linear direction along the bore hole in response to a pressure differential. Similar to the embodiments described above, each end of the cross-beam 260 extends through clearance holes 273, 274 disposed on opposite sides of the bore hole 226 which can be configured to provide overload protection.

Each end of the sensing beams 256, 258 is fixed to the displacement body 218 so that displacement of the cross-beam 260 in response to a pressure differential causes the sensing beams to deflect in proportion to the magnitude of the pressure differential. Strain gauges 275 can be provided on one or both sensing beams 256, 258 to produce an electrical signal that is proportional to the magnitude of the deflection of the beam and which can be converted to a pressure differential measurement.

The displacement body 218 can include a support extension 276 on which can be mounted a printed circuit board 278 on a nomex pad 280. The strain gauges 272 can be electrically coupled to monitoring equipment (not shown) through the printed circuit board 278 and a cable 282 which passes through the cover 224 of the transducer.

As an aid in testing the pressure transducer, pressure probes 284 can be inserted through the transducer connectors 244, 246 and into the vertical fluid passages 248, 250 of the pressure port plates 220, 222 to connect the pressure transducer to test pressure sources. An O-ring 286 can be provided in each fluid passage 248, 250 adjacent the connectors 244, 246 to ensure a proper seal between the probes and the pressure transducer during testing. Advantages of using the pressure probes for testing purposes include avoiding damage to the connectors 244, 246 and reducing testing time associated with coupling and uncoupling the transducer to a test fixture.

The illustrative embodiments shown in FIGS. 15–22 are directed to differential pressure transducers that can be used to measure differential pressures in equipment such as refrigeration systems, compressors and the like in which one end of the transducer is fluidly coupled to the separate pressure sources. These embodiments can be coupled to the pressure sources using a single hydraulic connector such as a threaded connector, a quick connect/disconnect type connector and the like.

In the embodiment illustrated in FIGS. 15–19, the differential pressure transducer 288 includes three major components, namely, a coupling member 290, an interface plate 292, and a differential pressure sensing module 294. The coupling member 290 is mounted to the bottom portion of the interface plate 292 and the differential pressure sensing module 294 is mounted to the upper portion of the interface plate 292 opposite the coupling member. The components can be mounted to each other using heat fusion, bonding, fasteners and the like.

The coupling member is generally cylindrical and includes an upper portion 296 that is configured to mate with the interface plate 292 and a lower portion 298 that is configured to be coupled with a connector or other means to hydraulically connect the pressure transducer to the pressure sources. The upper portion 296 of the coupling member includes an annular seat 300 protruding in an upward direction from the top face 302 of the coupling member. The lower portion 298 can include external threads or it can be configured as a quick connect/disconnect coupling. However, it should be understood that other means may be employed to couple the pressure transducer to the pressure sources.

The interface plate 292 has an annular recess 304 disposed on the bottom face 306 of the interface plate which receives the annular seat 300 of the coupling member. The interface plate 292 is also provided with two concentric counter bores 308, 310 which depend downwardly from the upper face 312 of the interface plate. The inner counter bore 308 has a bottom surface 314 which serves as the mounting surface for the differential pressure sensing module 294. The outer counter bore 310, which is disposed above the lower counter bore 308 and has a diameter that is greater than the diameter of the lower counter bore, has an annular support surface 316 for supporting the sensing beams of the displacement sensing unit as described more fully below.

The differential pressure sensing module 294 includes a tubular body 318, an upper diaphragm module 320, a lower diaphragm module 322, and a displacement sensing unit 324 disposed between the upper and lower diaphragm modules 320, 322. The upper diaphragm module 320 includes a cylindrical base 326 having a downwardly facing counterbore 328, a diaphragm 330 disposed adjacent the counterbore 328 to form an upper plenum 332, and a force collector 334 mounted to the diaphragm 330 opposite the plenum 332. Similarly, the lower diaphragm module 322 includes an annular base 336, a diaphragm 338 mounted to the lower base 336 to form a downwardly facing cavity 340, which becomes a lower plenum when the sensing module 294 is mounted to the interface plate 292, and a force collector 342 mounted to the diaphragm 338 opposite the plenum 340. The bases 326, 336, the diaphragms 330, 338, and the force collectors 334, 342 can be heat fused or bonded together to form the upper and lower diaphragm modules 320, 322. However, it should be understood that other fastening techniques can be used to form the diaphragm modules.

The displacement sensing unit 324 is similar to the sensing units described above for the various illustrative embodiments. The displacement sensing unit 324 includes a pair of parallel sensing beams 344, 346 and a cross-beam 348 disposed between and interconnecting the center portions of the sensing beams 344, 346. The cross-beam 348 is provided with an alignment hole 350 which receives alignment posts 352 disposed on the force collectors 334, 342 to align the displacement sensing unit 324 with the upper and lower diaphragm modules 320, 322. Strain gauges 354 can be mounted to at least one of the sensing beams 344, 346 to measure the deflection of the sensing beam in response to a pressure differential across the sensing module 294.

Figure 16:
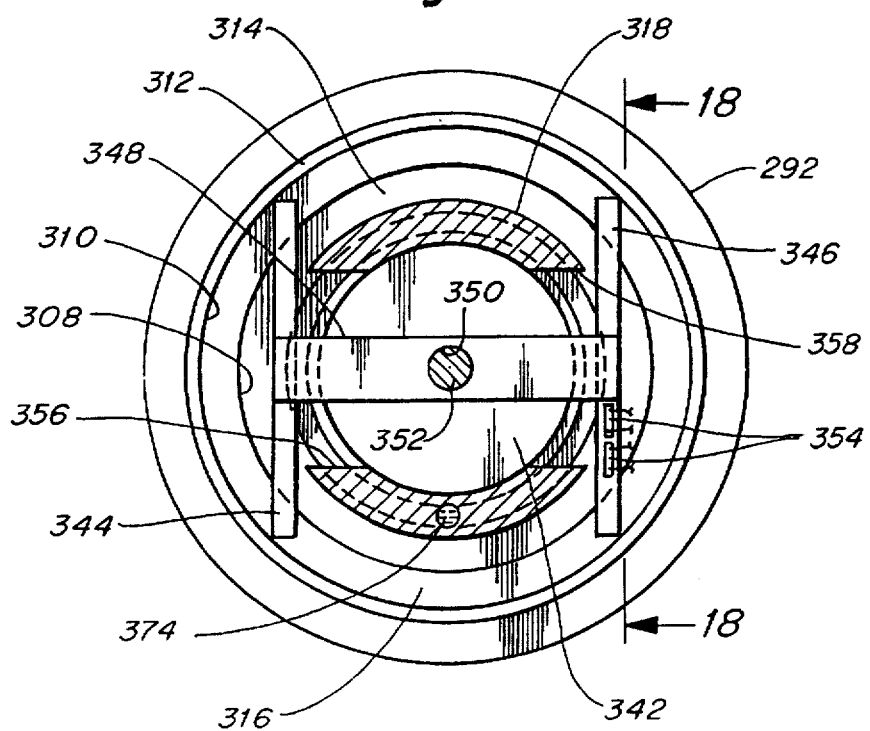
FIG. 16 is a cross-sectional plan view of the differential pressure transducer of FIG. 15 taken along section line 16—16 in FIG. 15.
Figure 17:
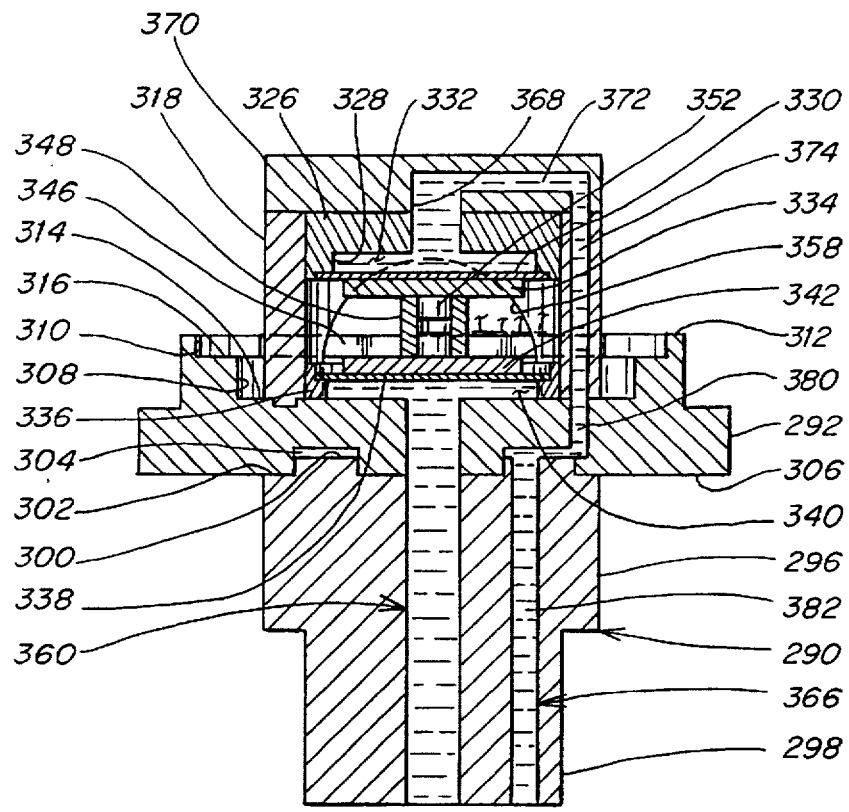
FIG. 17 is a cross-sectional elevational view of the differential pressure transducer of FIG. 15 taken along section line 17—17 in FIG. 15.
Figure 18:
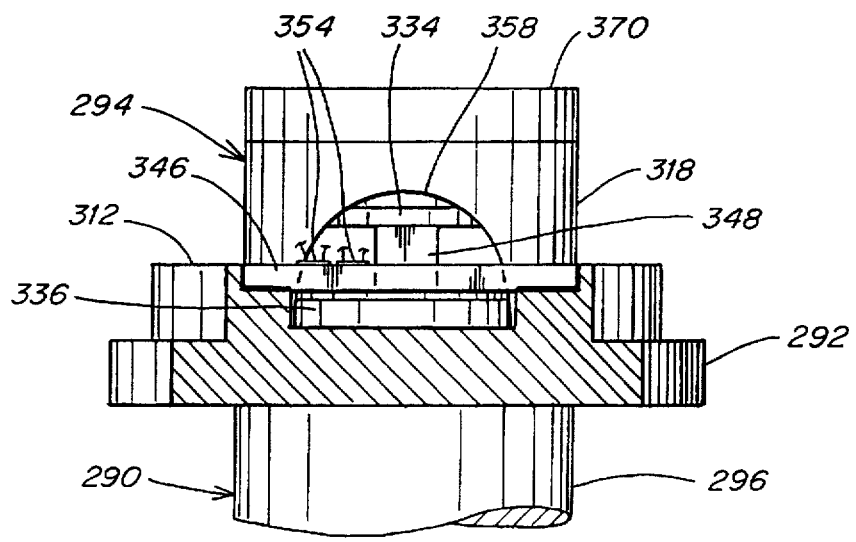
FIG. 18 is a fragmentary cross-sectional elevational view of the differential pressure transducer of FIG. 15 taken along section line 18—18 in FIG. 16.
Figure 19:
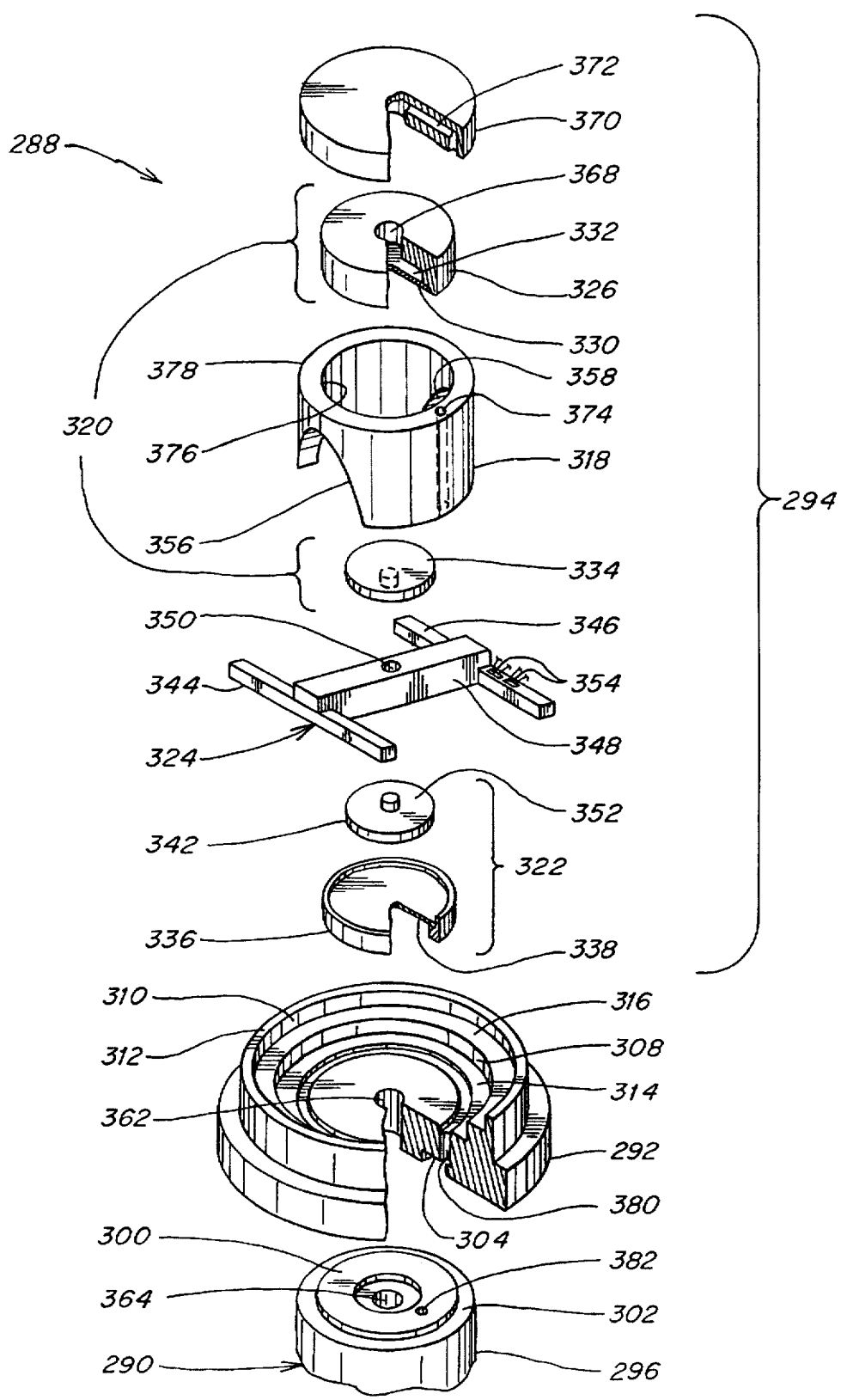
FIG. 19 is an exploded perspective view of the differential pressure transducer of FIGS. 15-18.

In this embodiment, the diaphragm modules 320, 322 are stacked in a vertical configuration wherein the cross-beam 348 is displaced in the vertical direction in response to a pressure differential. The diaphragm modules 320, 322 are disposed in opposite ends of the body is 318 with the displacement sensing unit 324 disposed therebetween. The body 318 is provided with semi-circular apertures 356, 358 disposed on opposite sides of the body 318. The cross-beam 348 extends across the body 318 and through the apertures 356, 358 so that the sensing beams 344, 346 are disposed outside the body 318 where they are easily accessible for assembly and maintenance. The apertures 356, 358 provide clearance that allows the cross-beam to move in the up and down vertical direction in response to a pressure differential. The apertures can also be used to provide an overload protection for the pressure transducer by limiting the allowable movement of the cross-beam. The diaphragm modules 320, 322 can be heat fused, bonded, and the like to the displacement body 318 and the cross-beam of the displacement sensing unit 324. When the differential pressure sensing module 294 is mounted to the interface plate 292, the ends of the sensing beams 344, 346 are supported on and fixed to the annular support surface 316 of the outer counterbore 310 as best shown in FIG. 16.

To measure the pressure differential between two pressure sources, the upper and lower plenums 332, 340 are fluidly coupled to the pressure sources through separate fluid passages disposed within the pressure transducer. The lower plenum 340 is fluidly coupled to a pressure source through a vertical fluid passage 360 which is comprised of a bore 362 extending through the interface plate 292 and a bore 364 extending through the coupling member 290. The bores 362, 364 are aligned with each other along the vertical axis of the pressure transducer.

The vertical configuration of the diaphragm modules 320, 322, requires the upper plenum 332 to be fluidly coupled to its source pressure through an upper plenum fluid passage 366 that is more complex than the lower plenum passage 360. The upper plenum fluid passage 366 includes a vertical bore hole 368 extending along the transducer axis through the upper base 326 to the supper plenum 332. A pressure sealing cap 370, which is mounted on top of the differential pressure sensing module 294, includes a generally U-shaped fluid passage 372. One end of the fluid passage 372 is aligned with the upper base bore hole 368 and the opposite end extends downwardly and is aligned with a vertical bore hole 374 extending downwardly through the displacement body 318. The displacement body fluid passage 374 is disposed between the inner and outer walls 376, 378 (FIG. 19) of the body. The bottom end of the displacement body fluid passage 374 aligns with the upper end of an L-shaped fluid passage 380 provided in the interface plate 292. The lower horizontal portion of the L-shaped fluid passage 380 extends radially inward toward the central axis of the transducer so that it is disposed above the annular seat 300 of the coupling member 290. The coupling member 290 is provided with a vertical fluid passage 382 extending downwardly from the annular seat 300, where the passage 382 is fluidly coupled to the interface plate fluid passage 380, to the bottom of the coupling member 290 where the upper plenum fluid passage 366 can be coupled to the pressure source.

Figure 20:
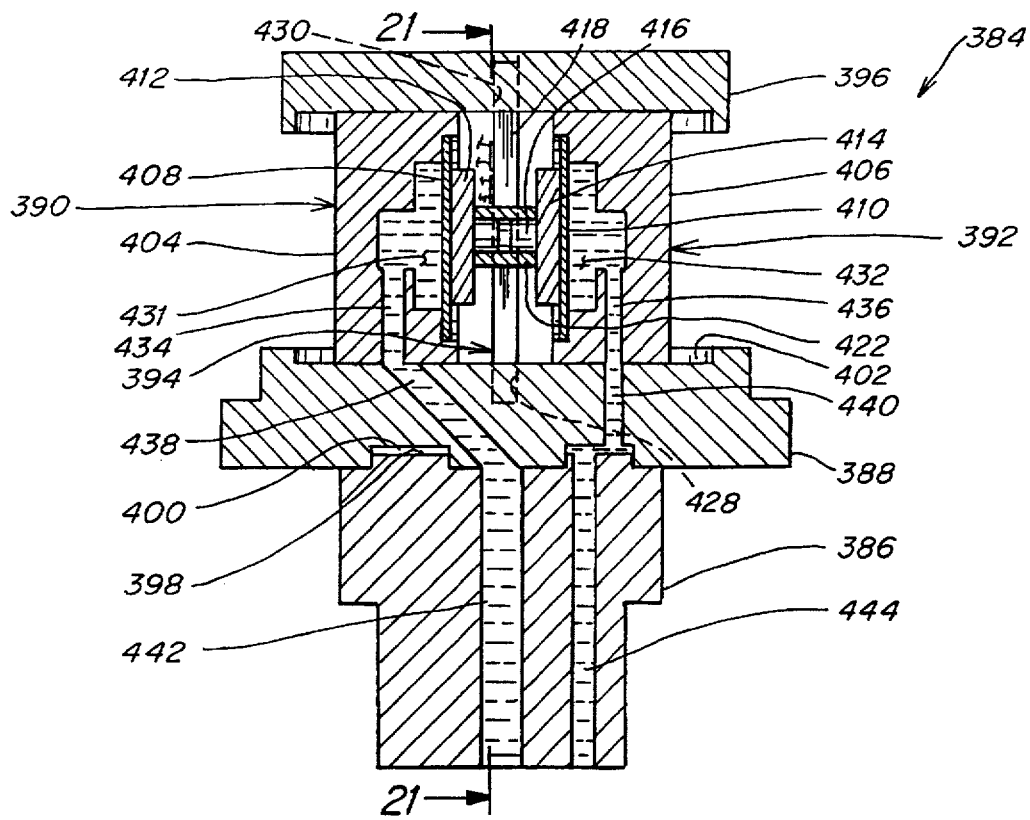
FIG. 20 is a cross-sectional elevational view of another alternate illustrative embodiment for a differential pressure transducer of the present invention.
Figure 21:
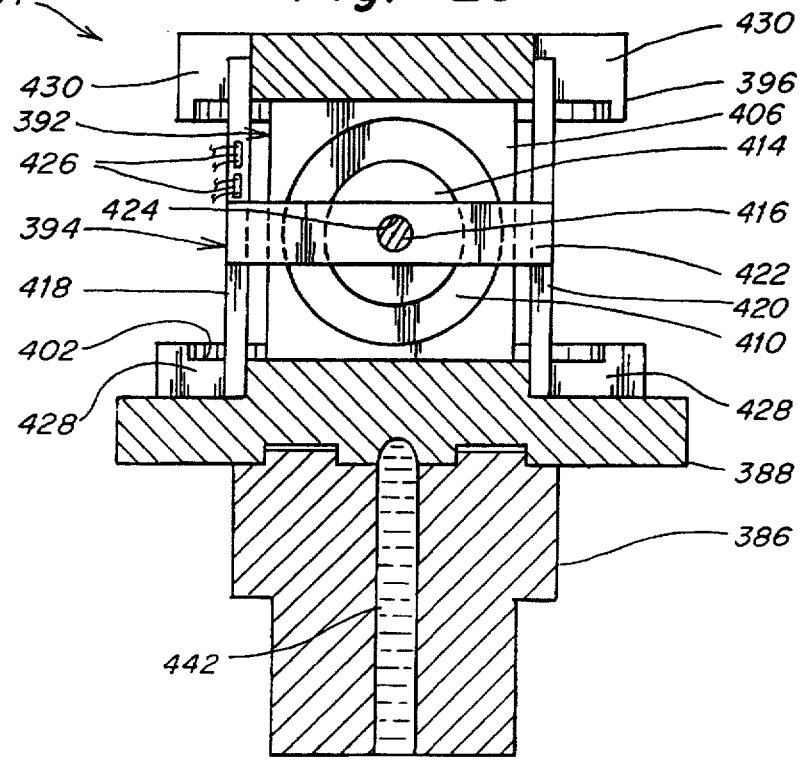
FIG. 21 is a cross-sectional elevational view of the differential pressure transducer of FIG. 20 taken along section line 21—21 in FIG. 20.
Figure 22:
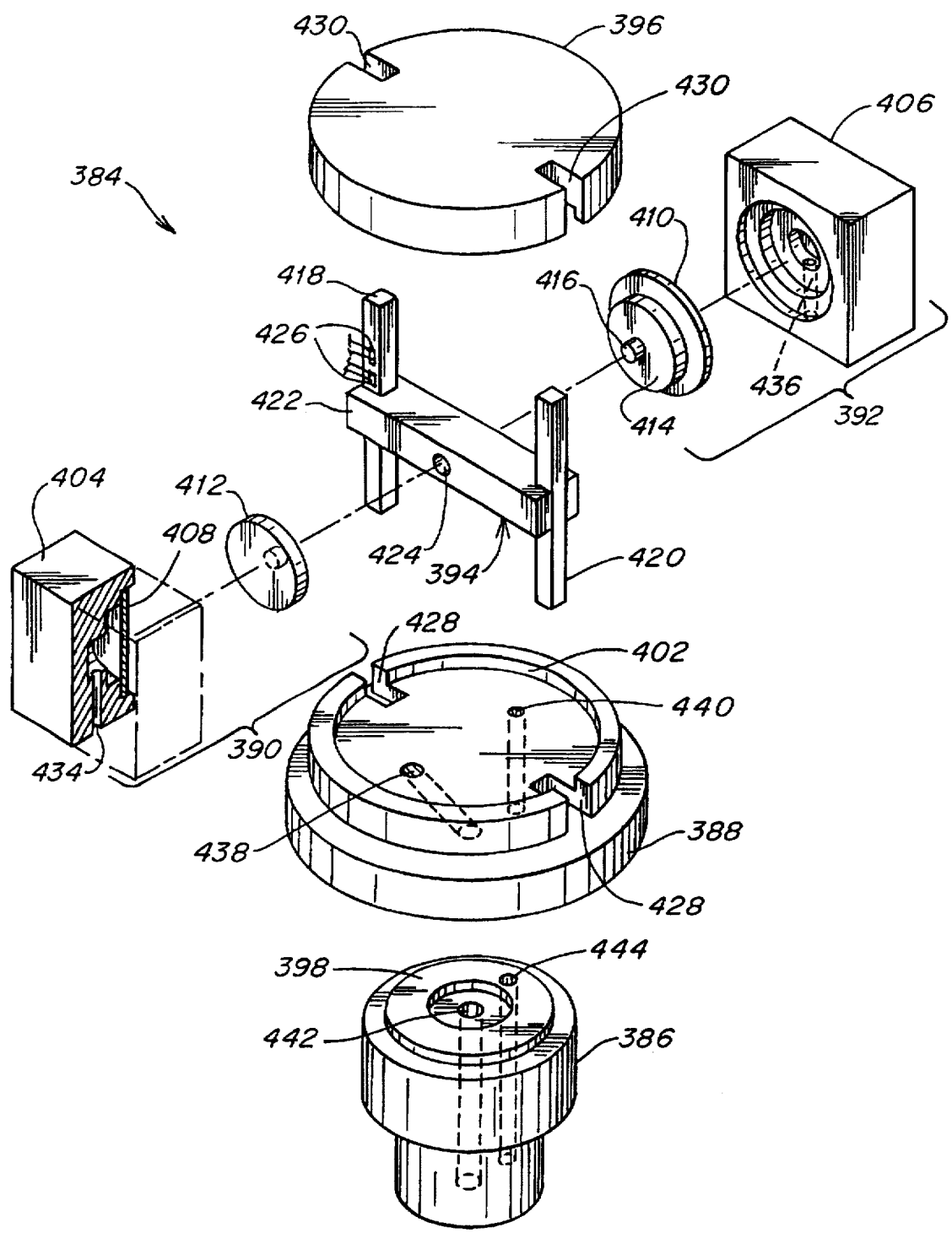
FIG. 22 is an exploded perspective view of the differential pressure transducer of FIGS. 20-21.

The illustrative embodiment for a differential pressure transducer shown in FIGS. 20–22 is very similar to the embodiment described in conjunction with FIGS. 15–19. However, rather than having a vertical configuration of diaphragm modules, this embodiment is provided with a horizontal configuration of diaphragm modules in which the movement of the displacement sensing unit occurs along a horizontal axis which is perpendicular to the central axis of the pressure transducer. The horizontal configuration of the diaphragm modules advantageously simplifies the fluid passages by allowing the fluid passages to be more equal in length and less complex using fewer parts when compared to the vertical configuration described above.

In this embodiment, the differential pressure transducer 384 includes a coupling member 386, an interface plate 388, a pair of diaphragm modules 390, 392, a displacement sensing unit 394 and a cap 396. As described above, the coupling member 386 is provided with an annular seat 398 which is received within a corresponding annular recess 400 provided in the bottom of the interface plate 388. Similar to the embodiments described above, the displacement sensing unit 394 is disposed between and attached to the diaphragm modules 390, 392 which are mounted within an upwardly depending counter bore 402 provided on the top of the interface plate 388 opposite the coupling member 386. The cap 396 is mounted to the top of the diaphragm modules 390, 392 to provide support for the modules and the displacement sensing unit 394.

Each diaphragm module 390, 392 includes a base 404, 406, a diaphragm 408, 410 mounted to the base, and a force collector 412, 414 mounted to the outer face of the diaphragm opposite the base. Each force collector 412, 414 is provided with an alignment post 416 disposed along the central displacement axis of the diaphragm which is used to align the diaphragm modules with the displacement sensing unit along the displacement axis. The collectors are fixedly attached to the sensing unit so as to function as a single displacement element.

Similar to the embodiments described above, the displacement sensing unit 394 includes a pair of parallel sensing beams 418, 420 and a cross-beam 422 disposed between and interconnecting the center portions of the sensing beams. An alignment hole 424 is provided on the cross-beam 422 to receive the alignment post 416 provided on each force collector 412, 414. Measurement devices, such as strain gauges 426, can be mounted to at least one of the sensing beams 418, 420 to measure the strain resulting from the deflection of the sensing beams which is proportional to the pressure differential across the diaphragm modules.

As illustrated in FIGS. 20–22, the displacement sensing unit 394 is mounted between the diaphragm modules 390, 392 in a generally H-shaped configuration. The sensing beams 418, 420 are disposed in a vertical direction parallel to the center axis of the transducer with the cross-beam being disposed horizontally across the transducer center axis. The lower ends of the sensing beams 418, 420 are rigidly secured within slots 428 provided in the upper portion of the interface plate 388. Similarly, the upper ends of the sensing beams are rigidly secured in slots 430 provided in the cap 396.

As described above, a pressure differential between selected pressure sources is measured by the relative displacement of the displacement sensing unit 394 in response to forces produced by pressures within plenums 430, 432 provided in the diaphragm modules 390, 392. Pressure media from the pressure sources are carried to the plenums 430, 432 through separate fluid passages provided in the transducer.

Each plenum 430, 432 is fluidly coupled to the interface plate 388 through a vertical fluid passage 434, 436 extending from the plenums to the bottom of each diaphragm module base 404, 406. The diaphragm module fluid passages 434, 436 are fluidly coupled to the coupling member 386 through fluid passages 438, 440 extending from the upper surface to the lower surface of the interface plate 388. One of the fluid passages 438 is angled radially inward from the upper surface of the interface plate to the central axis of the coupling member at the bottom of the interface plate. The other interface plate fluid passage 440 is generally L-shaped and extends from the upper surface of the interface plate in a vertical downward direction to the annular recess 400 and then extends radially inward in a horizontal direction to lie above the annular seat 398 of the coupling member 386. The angled fluid passage 438 through the interface plate is then fluidly coupled to a vertical fluid passage 442 extending along the center axis through the coupling member 386. The L-shaped fluid passage 440 through the interface plate is fluidly coupled to a vertical fluid passage 444 extending through the coupling member 386 adjacent the center passage 442 from the annular seat 398 to the bottom of the coupling member. The fluid passages 442, 444 and the coupling member 386 can be fluidly coupled to the pressure sources using various hydraulic connections (not shown) known in the art.

The differential pressure transducers of the present invention can be used in a wide range of applications. For example, the transducers can be used to measure pressure differentials of coolants in refrigeration systems such as air conditioners, chillers and the like. The transducers can be used to measure oil and hydraulic fluid pressures and the like. The transducers can also be used to monitor various processes. One such application would be to measure the pressure differential across a filter as a means of monitoring when the filter should be replaced as indicated by an increase in the pressure differential. The flow rates of fluids through a system can also be monitored by measuring the pressure differential across the system. It should be understood that these applications are exemplary, and numerous other applications for the transducers are possible and will readily occur to those skilled in the art.

The differential pressure transducer of the present invention can advantageously be used with various pressure media without having to adapt the transducer for use with each type of media. Additionally, the transducer can be used to measure the pressure differential between different pressure media or a pressure media that can change phases between liquid and gas, such as refrigeration coolants.

Having thus described several illustrative embodiments of the invention, various alterations, modifications and improvements will readily occur to those skilled in the art. Such alterations, modifications and improvements are intended to be within the spirit and scope of the invention. Accordingly, the foregoing description is by way of example only and is limited only as defined in the following claims and the equivalents thereto.

We claim:

1. A differential pressure transducer for measuring a pressure differential between a first pressure source and a second pressure source, the first pressure source having a first pressure and the second pressure source having a second pressure, the differential pressure transducer comprising:

a housing constructed and arranged to be fluidly coupled to the first and second pressure sources;

a displacement element movably supported in the housing along a first axis, the displacement element having a first end and a second end and being constructed and arranged to move along the first axis in response to the pressure differential between the first and second pressure sources when the first and second ends are subjected to the first and second pressures;

at least one sensing beam affixed to the housing in spaced relation to the first axis so that the at least one sensing beam does not intersect the first axis;

a force transfer beam connected to the displacement element and the at least one sensing beam, the force transfer beam being constructed and arranged to deflect a portion of the at least one sensing beam in response to the movement of the displacement element; and a sensor coupled to the at least one sensing beam to provide a signal that is proportional to the movement of the displacement element.

2. The differential pressure transducer recited in claim 1, wherein the displacement element is a single piston.

3. The differential pressure transducer recited in claim 2, wherein the single piston is hollow.

4. The differential pressure transducer recited in claim 3, wherein the single piston includes a tubular body and end caps disposed at each end of the body.

5. The differential pressure transducer recited in claim 2, wherein the single piston is made of a molded polymer.

6. The differential pressure transducer recited in claim 1, wherein the sensor includes a strain gauge mounted to the at least one sensing beam to provide an electrical signal having a magnitude that is proportional to a strain in the at least one sensing beam, the strain gauge being mounted to an externally accessible portion of the at least one sensing beam.

7. The differential pressure transducer recited in claim 6, wherein the force transfer beam is stiffer than the at least one sensing beam so that substantially all the movement of the displacement element is transferred to the at least one sensing beam.

8. The differential pressure transducer recited in claim 1, wherein the force transfer beam is positioned transverse to the first axis and is connected to the displacement element intermediate the first and second ends thereof.

9. The differential pressure transducer recited in claim 8, wherein the displacement element includes first and second force collectors attached to opposing sides of the force transfer beam, the first and second ends of the displacement element being respectively disposed on the first and second force collectors.

10. The differential pressure transducer recited in claim 9, further comprising:

a first diaphragm attached to the first force collector; and a second diaphragm attached to the second force collector.

11. The differential pressure transducer recited in claim 10, wherein the first and second diaphragms each has an unsupported portion surrounding the respective first and second force collectors, each unsupported portion being constructed and arranged to flex in response to the movement of the displacement element.

12. The differential pressure transducer recited in claim 11, wherein each unsupported portion is an annular member.

13. The differential pressure transducer recited in claim 1, wherein the force transfer beam and the at least one sensing beam are portions of a unitary member.

14. The differential pressure transducer recited in claim 13, wherein the unitary member is a stamped part.

15. The differential pressure transducer recited in claim 1, further comprising an overload protection constructed and arranged to limit the movement of the force transfer beam.

16. The differential pressure transducer recited in claim 1, wherein the at least one sensing beam includes first and second ends that are rigidly affixed to the housing.

17. The differential pressure transducer recited in claim 1, wherein the at least one sensing beam is disposed in a liquid-free portion of the housing.

18. The differential pressure transducer recited in claim 1, wherein the at least one sensing beam lies in a plane that is transverse to the first axis.

19. The differential pressure transducer recited in claim 18, wherein the plane is perpendicular to the first axis.

20. The differential pressure transducer recited in claim 19, wherein the force transfer beam lies in the plane.

21. A differential pressure transducer for measuring a pressure differential between a first pressure source and a second pressure source, the first pressure source having a first pressure and the second pressure source having a second pressure, the differential pressure transducer comprising:

a displacement element having a first end and a second end the displacement element being constructed and arranged to move in a linear direction in response to the pressure differential between the first and second pressure sources when the first and second ends are subjected to the first and second pressures;

a sensing element coupled to the displacement element, the sensing element being constructed and arranged to be deflected by the displacement element and to provide a signal that is proportional to the movement of the displacement element; and a force transfer beam connected to the displacement element and the sensing element, the force transfer beam being constructed and arranged to deflect the sensing element in response to the movement of the displacement element;

wherein the sensing element includes first and second sensing beams having first and second ends, the force transfer beam interconnecting the first and second sensing beams intermediate the first and second ends, the first and second sensing beams being constructed and arranged to be deflected by the force transfer beam.

22. The differential pressure transducer recited in claim 21, wherein the sensing element further includes an extensometer mounted to at least one of the first and second sensing beams to provide an electrical signal indicative of the pressure differential.

23. The differential pressure transducer recited in claim 21, wherein the first and second ends of the first and second sensing beams are fixed relative to the displacement element.

24. A differential pressure transducer for measuring a pressure differential between a first pressure source and a second pressure source, the first pressure source having a first pressure and the second pressure source having a second pressure, the differential pressure transducer comprising:

a body having first and second plenums, the body being constructed and arranged to be fluidly coupled to the first and second pressure sources so that the first plenum is at the first pressure and the second plenum is at the second pressure;

a displacement element movably supported between the first and second plenums, the displacement element having first and second ends, the first end being disposed adjacent the first plenum and the second end being disposed adjacent the second plenum, the displacement element being constructed and arranged to move along a displacement axis relative to the body in response to the first and second pressures;

a deflectable sensing element affixed to an external portion of the body;

a force transfer beam connected to the displacement element and the sensing element, the force transfer beam being constructed and arranged to deflect a portion of the sensing element in response to the movement of the displacement element; and a sensor mounted on the sensing element to detect the deflection of the sensing element and to provide a signal in proportion to the pressure differential.

25. The differential pressure transducer recited in claim 24, further comprising:

a first diaphragm disposed between the first plenum and the first end of the displacement element; and a second diaphragm disposed between the second plenum and the second end of the displacement element.

26. The differential pressure transducer recited in claim 25, wherein the first and second ends of the displacement element engage the first and second diaphragms.

27. The differential pressure transducer recited in claim 26, wherein the first and second ends of the displacement element are affixed to the first and second diaphragms.

28. The differential pressure transducer recited in claim 24, wherein the body includes overload protection constructed and arranged to limit the movement of the displacement element.

29. The differential pressure transducer recited in claim 28, wherein the overload protection includes an aperture disposed on the body which is adapted to receive the cross beam, the aperture being larger than the cross beam.

30. The differential pressure transducer recited in claim 24, wherein the sensor is disposed in a liquid-free portion of the body.

31. The differential pressure transducer recited in claim 24, wherein the sensing element is a sensing beam.

32. The differential pressure transducer recited in claim 31, wherein the sensing beam includes opposing ends that are rigidly affixed to the body.

33. The differential pressure transducer recited in claim 32, wherein the sensing beam is transverse to the displacement axis.

34. The differential pressure transducer recited in claim 33, wherein the displacement transfer beam is transverse to the displacement axis and the sensing beam.

35. The differential pressure transducer recited in claim 31, wherein the displacement transfer beam and the sensing beam lie in a plane that is transverse to the displacement axis.

36. The differential pressure transducer recited in claim 35, wherein the plane is perpendicular to the displacement axis.

37. A differential pressure transducer for measuring a pressure differential between a first pressure source and a second pressure source, the first pressure source having a first pressure and the second pressure source having a second pressure, the differential pressure transducer comprising:

a body having first and second plenums, the body being constructed and arranged to be fluidly coupled to the first and second pressure sources so that the first plenum is at the first pressure and the second plenum is at the second pressure;

a displacement element disposed between the first and second plenums, the displacement element having first and second ends, the first end being disposed adjacent the first plenum and the second end being disposed adjacent the second plenum, the displacement element being constructed and arranged to move along a single axis relative to the body in response to the first and second pressures; and a displacement sensing unit connected to the displacement element, the displacement sensing unit being constructed and arranged to respond to the movement of the displacement element to provide a signal in proportion to the pressure differential;

wherein the displacement sensing unit includes:

a first sensing beam having first and second ends;

a second sensing beam having first and second ends; and a cross beam connected to the first and second sensing beams intermediate the first and second ends and connected to the displacement element, the cross beam being constructed and arranged to move along the single axis with the displacement element and to deflect the first and second sensing beams.

38. The differential pressure transducer recited in claim 37, wherein the displacement sensing unit further includes an extensometer mounted to at least one of the first and second sensing beams.

39. The differential pressure transducer recited in claim 38, wherein the extensometer is disposed on a portion of the at least one of the first and second sensing beams that is externally accessible.

40. The differential pressure transducer recited in claim 37, wherein the first and second ends of the first and second sensing beams are connected to the body.

41. The differential pressure transducer recited in claim 37, wherein the first and second sensing beams each has a first deflection ratio and the cross beam has a second deflection ratio, the first deflection ratio being different from the second deflection ratio, the first and second deflection ratios being different.

42. The differential pressure transducer recited in claim 41, wherein the second deflection ratio is greater than the first deflection ratio.

43. The differential pressure transducer recited in claim 37, wherein the first and second sensing beams are parallel to each other and the cross beam extends between the first and second sensing beams transverse to the single axis.

44. A displacement sensing unit for use in a pressure transducer that includes a housing and a displacement element supported in the housing for movement in response to a differential pressure, the displacement sensing unit comprising:

at least one sensing beam having opposing first and second ends that are to be connected to the housing; and a cross beam connected to the at least one sensing beam intermediate the first and second ends, the cross beam to be connected to the displacement element to deflect the at least one sensing beam in a first direction when the cross beam is moved in the first direction by the displacement element, each of the at least one sensing beam and the cross beam extending along a respective axis that is transverse to the first direction.

45. The displacement sensing unit recited in claim 44, wherein the at least one sensing beam has a first deflection ratio, and the cross beam has a second deflection ratio, the first deflection ratio being different from the second deflection ratio.

46. The displacement sensing unit recited in claim 45, wherein the second deflection ratio is greater than the first deflection ratio.

47. The displacement sensing unit recited in claim 46, wherein the second deflection ratio is at least twenty times greater than the first deflection ratio.

48. The displacement sensing unit recited in claim 44, wherein the displacement sensing unit is a unitary member.

49. The displacement sensing unit recited in claim 44, further comprising a piezoelectric device that is mounted on the at least one sensing beam.

50. The displacement sensing unit recited in claim 49, wherein the piezoelectric device includes a strain gauge constructed and arranged to measure strain in the at least one sensing beam when the at least one sensing beam is deflected in response to pressure.

51. The displacement sensing unit recited in claim 44, wherein the axis of the at least one sensing beam and the axis of the cross beam lie in a common plane.

52. The displacement sensing unit recited in claim 51, wherein the axis of the at least one sensing beam is perpendicular to the axis of the cross beam.

53. A displacement sensing unit for use in a pressure transducer, the displacement sensing unit comprising:

a first sensing beam having first and second ends;

a second sensing beam having first and second ends; and a cross beam connected to the first and second sensing beams intermediate the first and second ends, the cross beam being constructed and arranged to deflect the first and second sensing beams when the cross beam is moved in response to pressure.

54. The displacement sensing unit recited in claim 53, wherein the first and second sensing beams are parallel to each other.

55. The displacement sensing unit recited in claim 53, further comprising:

a first support beam interconnecting the first end of the first sensing beam to the first end of the second sensing beam; and a second support beam interconnecting the second end of the first sensing beam to the second end of the second sensing beam.

56. The displacement sensing unit recited in claim 55, wherein the displacement sensing unit is a unitary member.

57. The displacement sensing unit recited in claim 56, further comprising a first support plate laminated to a first side of the unitary member, and a second support plate laminated to a second side of the unitary member.

58. The displacement sensing unit recited in claim 57, further comprising:

a first shim disposed between the first support plate and the unitary member; and a second shim disposed between the second support plate and the unitary member, wherein the cross beam can be moved between the first and second support plates.

59. A differential pressure transducer for measuring a pressure differential between a first pressure source and a second pressure source, the differential pressure transducer comprising:

a housing constructed and arranged to be fluidly coupled to the first and second pressure sources;

displacement means for transforming the pressure differential into a linear displacement proportional to the pressure differential;

deflection means for converting the linear displacement to a deflection, the deflection means being connected to the displacement means and to the housing, wherein at least a portion of the deflection means is affixed to an external portion of the housing; and sensing means for sensing the deflection of the deflection means, the sensing means being disposed on the deflection means.

60. The differential pressure transducer recited in claim 59, further comprising means for limiting the linear displacement of the displacement means.

61. The differential pressure transducer recited in claim 59, further comprising means for coupling the displacement means to the first and second pressure sources.

62. A differential pressure transducer for measuring a pressure differential between a first pressure source and a second pressure source, the differential pressure transducer comprising:

a housing constructed and arranged to be fluidly coupled to the first and second pressure sources;

displacement means for transforming the pressure differential into a linear displacement proportional to the pressure differential;

deflection means for converting the linear displacement to a deflection, the deflection means being connected to the displacement means and to the housing; and sensing means for sensing the deflection of the deflection means, the sensing means being disposed on the deflection means, wherein the sensing means is disposed in a liquid-free portion of the housing.

63. The differential pressure transducer recited in claim 62, wherein the sensing means is externally accessible.

64. The differential pressure transducer recited in claim 62, further comprising means for limiting the linear displacement of the displacement means.

* * * * *